(12) United States Patent
Hori

(10) Patent No.: US 11,907,466 B2
(45) Date of Patent: Feb. 20, 2024

(54) APPARATUS AND METHOD WHICH DISPLAYS ADDITIONAL INFORMATION ALONG WITH A DISPLAY COMPONENT IN RESPONSE TO THE DISPLAY COMPONENT BEING SELECTED

(71) Applicant: Koshiro Hori, Kanagawa (JP)

(72) Inventor: Koshiro Hori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/669,377

(22) Filed: Feb. 11, 2022

(65) Prior Publication Data
US 2022/0300134 A1    Sep. 22, 2022

(30) Foreign Application Priority Data

Mar. 19, 2021   (JP) .................................. 2021-046492

(51) Int. Cl.
*G06F 3/041*   (2006.01)
*G06F 3/147*   (2006.01)
*G06F 3/0354*  (2013.01)

(52) U.S. Cl.
CPC ...... *G06F 3/04162* (2019.05); *G06F 3/03545* (2013.01); *G06F 3/147* (2013.01)

(58) Field of Classification Search
CPC ... G06F 3/03545; G06F 3/04162; G06F 3/147
See application file for complete search history.

(56) References Cited

U.S. PATENT DOCUMENTS

| 2017/0075554 | A1* | 3/2017 | Sasayama ........... G06F 3/04845 |
| 2017/0277377 | A1* | 9/2017 | Siu ......... G06Q 10/109 |
| 2018/0240070 | A1* | 8/2018 | Siu ......... G06Q 10/109 |
| 2020/0320166 | A1* | 10/2020 | Rouaix ................. G06F 40/186 |

FOREIGN PATENT DOCUMENTS

| JP | 2001-306553 | 11/2001 |
| JP | 2004-013318 | 1/2004 |
| JP | 2005-129062 | 5/2005 |
| JP | 2019-204431 | 11/2019 |

* cited by examiner

*Primary Examiner* — Chun-Nan Lin
(74) *Attorney, Agent, or Firm* — XSENSUS LLP

(57) ABSTRACT

A display apparatus includes circuitry to display, on a display, a display component along with an object. The display component indicates a presence of information that is additional information corresponding to the display component and related to the object. The circuitry displays, in response to receiving a selection of the display component, an information display section that includes the information, along with the display component and the object.

17 Claims, 18 Drawing Sheets

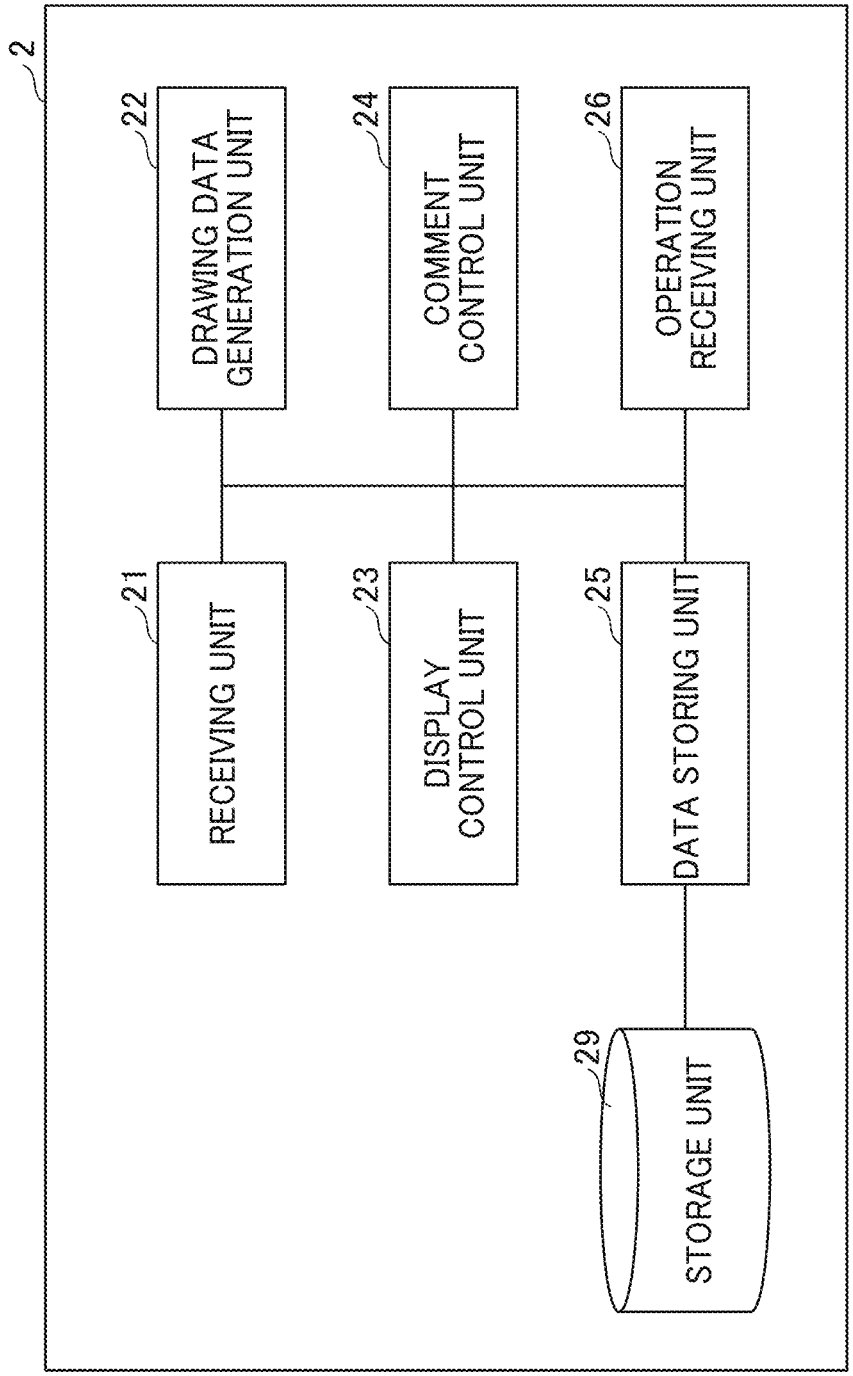

APPARATUS AND METHOD WHICH DISPLAYS ADDITIONAL INFORMATION ALONG WITH A DISPLAY COMPONENT IN RESPONSE TO THE DISPLAY COMPONENT BEING SELECTED

CROSS-REFERENCE TO RELATED APPLICATION

This patent application is based on and claims priority pursuant to 35 U.S.C. § 119(a) to Japanese Patent Application No. 2021-046492, filed on Mar. 19, 2021, in the Japan Patent Office, the entire disclosure of which is hereby incorporated by reference.

BACKGROUND

Technical Field

Embodiments of the present disclosure relate to a display apparatus, a display method, and a non-transitory recording medium.

Related Art

Display apparatuses such as electronic whiteboards having a touch panel display that displays strokes handwritten or drawn by a user with an input device, such as a dedicated electronic pen, or a finger are known. A display apparatus having a relatively large touch panel is used in a conference room and is shared by a plurality of users as an electronic whiteboard, for example.

A display apparatus that allows a user to input a comment on an object, which is represented by, for example handwritten data, displayed on the display apparatus is known. A technique in which an icon is set at a position where information such as a comment is input, and the information is displayed in response to receiving a selection of the icon, according to user operations, is known.

SUMMARY

An exemplary embodiment of the present disclosure includes a display apparatus including circuitry to display, on a display, a display component along with an object. The display component indicates a presence of information that is additional information corresponding to the display component and related to the object. The circuitry displays, in response to receiving a selection of the display component, an information display section that includes the information, along with the display component and the object.

An exemplary embodiment of the present disclosure includes a display method. The display method including displaying, on a display, a display component along with an object. The display component indicates a presence of information that is additional information corresponding to the display component and related to the object. The display method includes displaying, in response to receiving a selection of the display component, an information display section that includes the information, along with the display component and the object.

An exemplary embodiment of the present disclosure includes a non-transitory recording medium storing a plurality of instructions which, when executed by one or more processors, causes the processors to perform a method. The method including displaying, on a display, a display component along with an object. The display component indicates a presence of information that is additional information corresponding to the display component and related to the object. The method includes displaying, in response to receiving a selection of the display component, an information display section that includes the information, along with the display component and the object.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a block diagram illustrating an example of a functional configuration of the display apparatus according to the embodiment of the disclosure;

Figure 1:
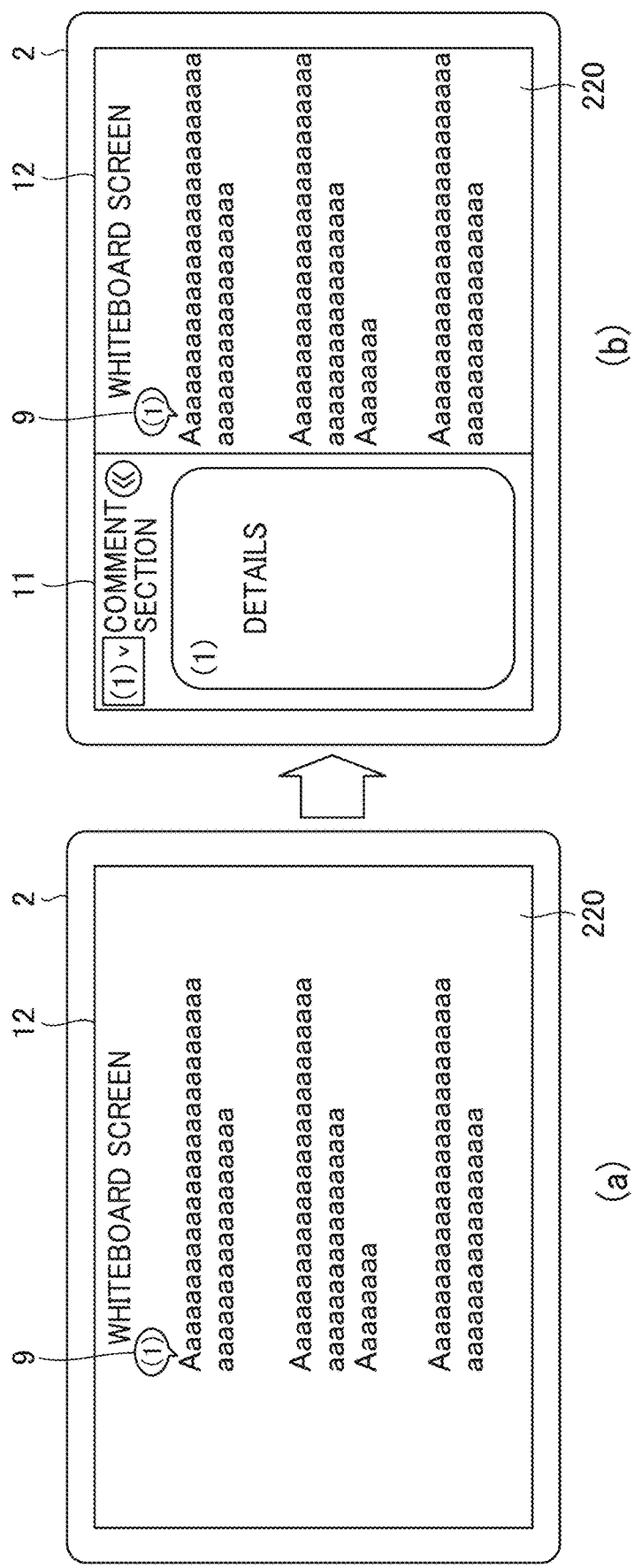
FIG. 1 is a diagram illustrating an example of a screen including a comment icon according to an embodiment of the disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description is given below of a display apparatus and a display method performed by the display apparatus according to embodiments of the present disclosure, with reference to the attached drawings.

First Embodiment

Overview of Operation:

FIG. 1 is a diagram illustrating an example of a screen including a comment icon 9 according to a first embodiment. The comment is defined as additional information such as an annotation and a memo, for example. The comment icon 9 is a display component indicating presence of additional information. The comment icon 9 is arranged at a position where the additional information is. The additional information is also referred to as details of comment or a detailed comment in the description of the embodiments.

In (a) of FIG. 1, the comment icon 9 is included in a display range 12. When a user desires to check or confirm the detailed comment, the comment icon 9 is pressed by using an input unit (input device) such as a finger or a pen. A display apparatus 2 determines whether the position of the comment icon 9 is closer to the left end or the right end of a display 220 (display screen). When the comment icon 9 is closer to the left end of the display 220, a comment section 11 is displayed on the left of the display 220. On the other hand, when the comment icon 9 is closer to the right end of the display, the comment section is displayed on the right side of the display 220.

In (b) of FIG. 1, an example of the comment section 11 is displayed on the display screen. The comment icon 9 is close to the left end of the display 220 in (a), and the comment section 11 is displayed on the left of the display 220 in (b), accordingly. When a part of the display 220 (display screen), but not all of the display screen, is available for the display apparatus 2 as a screen area, which of the left end or the right end of the screen area the comment icon 9 is closer to is determined.

As described above, the display apparatus 2 displays the detailed comment in an area dedicated to the detailed comment (comment section 11) without hiding objects represented by such as handwritten data and currently displayed in a display range 12.

In addition, the display apparatus 2 displays the comment section 11, in the display screen, a position that is relatively close to a position of the user who presses the comment icon 9, and this allows the user to edit the comment in the comment section 11 without changing his or her current position.

Terms

The display apparatus has an area that is available for input and larger than a display range that is a range to be displayed on the display. The display range is a part of the area available for input. The display range refers to a range currently displayed on the display.

"Input device" may be any devices with each of which user hand drafted input including handwriting input is performable by designating coordinates on a touch panel. Examples thereof include a pen, a human finger, a human hand, and a bar-shaped member.

In the present disclosure, "hand drafted input" relates to a user input such as handwriting, drawing and other forms of input. The hand drafted input may be performed via touch interface, with a tactile object such as a pen or stylus or with the user's body. The hand drafted input may also be performed via other types of input, such as gesture-based input, hand motion tracking input or other touch-free input by a user. The following discussion will refer to handwriting input and handwriting input data, but other forms of hand drafted input may be utilized and are within the scope of the present disclosure.

A series of user operations including engaging a writing mode, recording movement of an input device or portion of a user, and then disengaging the writing mode is referred to as a stroke. The engaging of the writing mode may include, if desired, pressing an input device against a display or screen, and disengaging the writing mode may include releasing the input device from the display or screen. Alternatively, a stroke includes tracking movement of the portion of the user without contacting a display or screen. In this case, the writing mode may be engaged or turned on by a gesture of a user, pressing a button by a hand or a foot of the user, or otherwise turning on the writing mode, for example using a pointing device such as a mouse. The disengaging of the writing mode can be accomplished by the same or different gesture used to engage the writing mode, releasing the button, or otherwise turning off the writing mode, for example using the pointing device or mouse. "Stroke data" is data based on a trajectory of coordinates of a stroke input with the input device, and the coordinates may be interpolated appropriately. "Handwritten data" is data having one or more stroke data, namely including stroke data corresponding to one or more strokes. "User hand drafted input" represents input of hand drafted data according to a user operation, and includes handwriting input. "Handwriting input represents input of handwritten data according to a user operation.

A character string obtained by character recognition and conversion performed on the hand drafted data including the handwritten data may include, in addition to text data, data displayed according to a user operation, such as a stamp of a given character or mark such as "complete," a graphic including a circle, a rectangle, a line, and a star, a balloon, and a note (mark). The character string includes one or more characters processed by a computer. The character string actually is one or more character codes. Characters include numbers, alphabets, and symbols, for example. The character string is also referred to as text data.

An "object" refers to an item displayed, on a screen. The term "object" in this specification represents an object of display. In the description of embodiments, examples of object include what is represented by hand drafted data, graphics (for example, circles, rectangles, arrows), stamps, balloons, notes (marks), and images.

The display range 12 refers to a range displayed on the display 220. The area available for input is an input-available range, a range available for input of the hand drafted data including the handwritten data performed according to a user operation, for example. The display range 12 is a part of the area available for input.

The display component is a part of the screen that is visually distinguishable from other parts of the screen, for example, in color or shape. The display component is not a component disassembled from the display apparatus 2 but any component visually distinguished by the human eye from, for example, any object or background of the screen. For example, the comment icon 9 is a display component.

Any form is applicable for the information, as long as the information is displayed on the display apparatus 2 according to a user operation. Examples of the form of the information includes handwriting represented by handwritten data, a character string, a figure, or an image. The information is referred to as a comment in the description of embodiments.

With respect to a display component that indicates the presence of information, presence of the display component means that the presence of some information of all or a part of that is not displayed. For example, in (a) of FIG. 1, although the comment icon 9 is displayed in the display range 12, display content is merely "(1)," and the detailed comment is not displayed. By selecting the comment icon 9, the detailed comment is displayed as illustrated in (b) of FIG. 1.

"Information display section" is a section in which information corresponding to a display component is displayed. More specifically, all parts of the information is displayed in the information display screen. In the description of embodiments of the disclosure, the information display section is referred to as a comment section.

Configuration.

Figure 2:
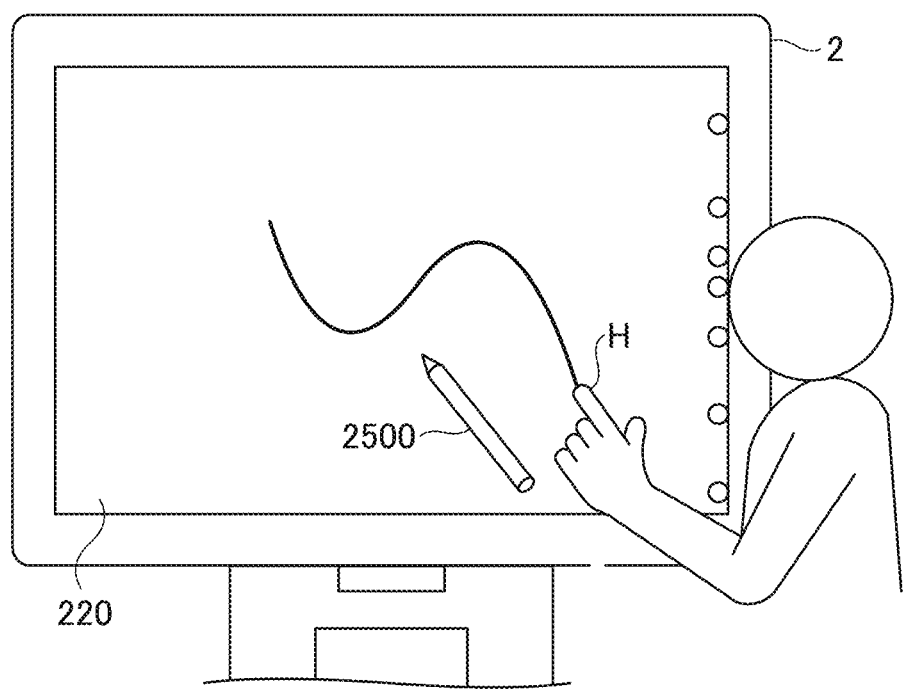
FIG. 2 is a schematic perspective view illustrating an example structure of a display apparatus according to the embodiment of the disclosure.

FIG. 2 is a schematic perspective view illustrating an example structure of the display apparatus 2, according to the present embodiment. A user uses the display apparatus 2. In the display apparatus 2 according to the present embodiment, the user can perform a user hand drafted input including a handwriting input on the display 220 (display screen) with the input device such as a hand H or an electronic pen 2500.

Although the display apparatus 2 illustrated in FIG. 2 is placed landscape, the display apparatus 2 may be placed portrait. The user can rotate the display apparatus 2 around the center (middle) of the display 220 as an axis for switching between the landscape placement and the portrait placement.

Figure 3:
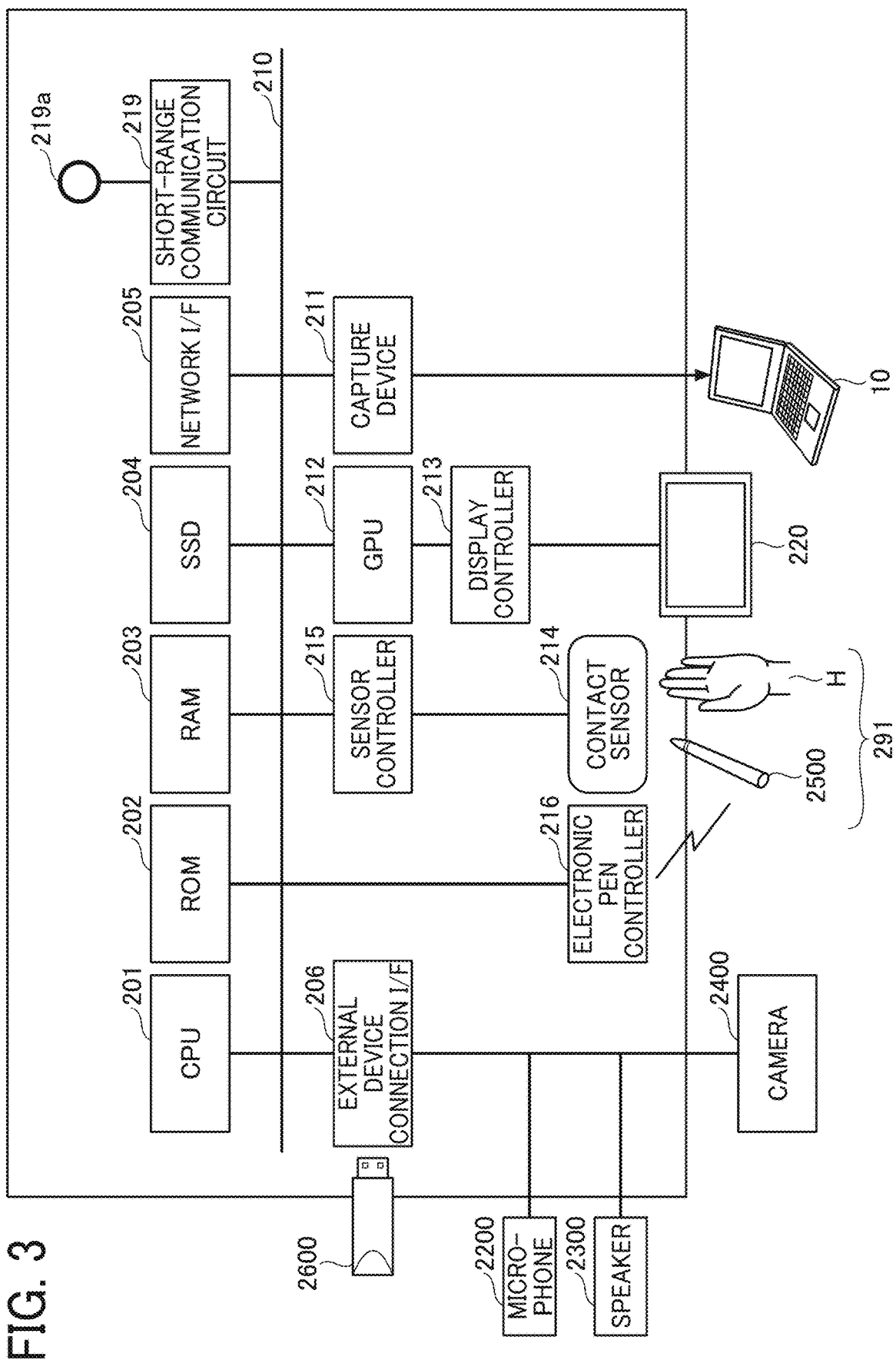
FIG. 3 is a block diagram illustrating an example of a hardware configuration of the display apparatus according to the embodiment of the disclosure.

Hardware Configuration:

FIG. 3 is a block diagram illustrating an example of a hardware configuration of the display apparatus 2 according to the present embodiment. The display apparatus 2 includes a central processing unit (CPU) 201, a read only memory (ROM) 202, a random-access memory (RAM) 203, a solid-state drive (SSD) 204, a network interface (I/F) 205, and an external device connection I/F 206. The display apparatus 2 is a shared terminal for sharing information.

The CPU 201 controls entire operation of the display apparatus 2. The ROM 202 stores a control program such as an initial program loader (IPL) to boot the CPU 201. The RAM 203 is used as a work area for the CPU 201.

The SSD 204 stores various data such as a control program for the display apparatus 2. This program may be an application that runs on an information processing apparatus equipped with a general-purpose operating system (OS) such as WINDOWS, MAC OS, ANDROID, and IOS. In this case, the display apparatus 2 is usually used as a general-purpose information processing terminal. However, when a user executes an installed application program, the display apparatus 2 receives handwriting or the like performed by the user similarly to a dedicated display apparatus.

The network I/F 205 controls communication with an external device through a network. The external device connection I/F 206 controls communication with a universal serial bus (USB) memory 2600, and external devices, such as a camera 2400, a speaker 2300, and a microphone 2200, for example.

The display apparatus 2 further includes a capture device 211, a graphics processing unit (GPU) 212, a display controller 213, a contact sensor 214, a sensor controller 215, an electronic pen controller 216, the short-range communication circuit 219, and an antenna 219a for the short-range communication circuit 219.

The capture device 211 causes a display of a personal computer (PC) 10 to display a still image or a motion video based on image data captured by the capture device 211. The GPU 212 is a semiconductor chip dedicated to graphics. The display controller 213 controls display of an image processed by the GPU 212 for output through a display 220, for example.

The contact sensor 214 detects a touch made onto the display 220 with the electronic pen 2500 or a user's hand H. The electronic pen 2500 and the hand H are collectively referred to as input devices 291 when not distinguished from each other.

The sensor controller 215 controls operation of the contact sensor 214. The contact sensor 214 inputs and senses a coordinate by using an infrared blocking system. More specifically, the display 220 is provided with two light receiving elements disposed on both upper side ends of the display 220, and a reflector frame disposed at the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame.

The contact sensor 214 outputs an identifier (ID) of the infrared ray that is blocked by an object after being emitted from the light receiving elements, to the sensor controller 215. Based on the ID of the infrared ray, the sensor controller 215 detects a specific coordinate that is touched by the object. In other words, the contact sensor 214 includes a touch panel. The electronic pen controller 216 communicates with the electronic pen 2500 to detect a touch by using the tip or bottom of the electronic pen 2500 to the display 220. The short-range communication circuit 219 is a communication circuit in compliance with a near field communication (NFC) or a BLUETOOTH, for example.

The display apparatus 2 further includes a bus line 210. Examples of the bus line 210 include an address bus and a data bus, which electrically connect the components including the CPU 201, one another.

The contact sensor 214 is not limited to use the infrared blocking system, but may use, for example, a capacitance touch panel that identifies a contact position by detecting a change in capacitance. Further, the contact sensor 214 may use a resistance film touch panel that identifies a contact position by a change in voltage of two opposing resistance films. In another example, the contact sensor 214 may use an electromagnetic induction touch panel that identifies a contact position by detecting electromagnetic induction caused by contact of an object to the display. As described above, the contact sensor 214 may use various types of detection devices. In addition to or alternative to detecting a touch by the tip or bottom of the electronic pen 2500, the electronic pen controller 216 may also detect a touch by another part of the electronic pen 2500, such as a part held by a hand of the user.

Functions:

FIG. 4 is a block diagram illustrating an example of a functional configuration of the display apparatus 2 according to the present embodiment. The display apparatus 2 illustrated in FIG. 4 includes a receiving unit 21, a drawing data generation unit 22, a display control unit 23, a comment control unit 24, a data recording unit 25, and an operation receiving unit 26.

The functional units of the display apparatus 2 are implemented by or are caused to function by operation of any of the elements illustrated in FIG. 3 according to an instruction from the CPU 201 according to an application loaded on the RAM 203.

The receiving unit 21 detects a contact position based on coordinates at which the input device 291 (for example a finger or the electronic pen 2500) have a contact on the display 220. The receiving unit 21 detects a contact position at predetermined time intervals and acquires a coordinate point sequence.

The drawing data generation unit 22 acquires the coordinates of the position touched by the tip of the input device 291 from the receiving unit 21. The drawing data generation unit 22 connects, or interpolates between, coordinate points into a coordinate point sequence by interpolation, to generate stroke data.

The display control unit 23 displays, on the display 220, for example, handwriting (object) represented by handwritten data, character strings, graphics, or images that is converted from handwritten data, or a menu with which a user perform an operation.

The comment control unit 24 manages comments. The comment control unit 24 manages a comment ID assigned to each comment, a position (coordinates, X, Y) of each comment, and a detailed comment.

The data recording unit 25 stores objects such as character strings, graphics, or images, which may be input by a user hand drafted input with respect to the display apparatus 2 in the storage unit 29. The comments, which are described above, are also stored in the storage unit 29 by the data recording unit 25. Table 1 is an example of comment information stored in the storage unit 29.

The operation receiving unit 26 receives an operation performed with respect to a menu displayed on the display apparatus 2 for receiving a user operation.

TABLE 1

| COMMENT ID | X COORDINATE | Y COORDINATE | DETAILED COMMNET |
|---|---|---|---|
| c001 | 10 | 10 | s001 |
| c002 | 520 | 480 | s002 |
| c003 | 720 | 360 | s003 |
| . . . | . . . | . . . | . . . |

With Table 1, the comment information that is related to a comment is indicated for each record. The comment information is information among the information stored in the storage unit 29. The comment ID, the position (X coordinate, Y coordinate), and the detailed comment are stored in the storage unit 29 in association with each other.

The comment ID is identification information for identifying a comment in the area available for input. The area available for input is larger than the display range 12, and the comment ID is unique to the input-available range.

The X coordinate indicates a coordinate of the comment icon 9 on an X-axis in the area available for input.

The Y coordinate indicates a coordinate of the comment icon 9 on a Y-axis in the area available for input.

The detailed comment is a comment text. The detailed comment may be represented by handwritten data or a character string converted by character recognition, or handwriting recognition. The detailed comment may be represented by a figure, an icon, an image, or audio data.

Figure 5A:
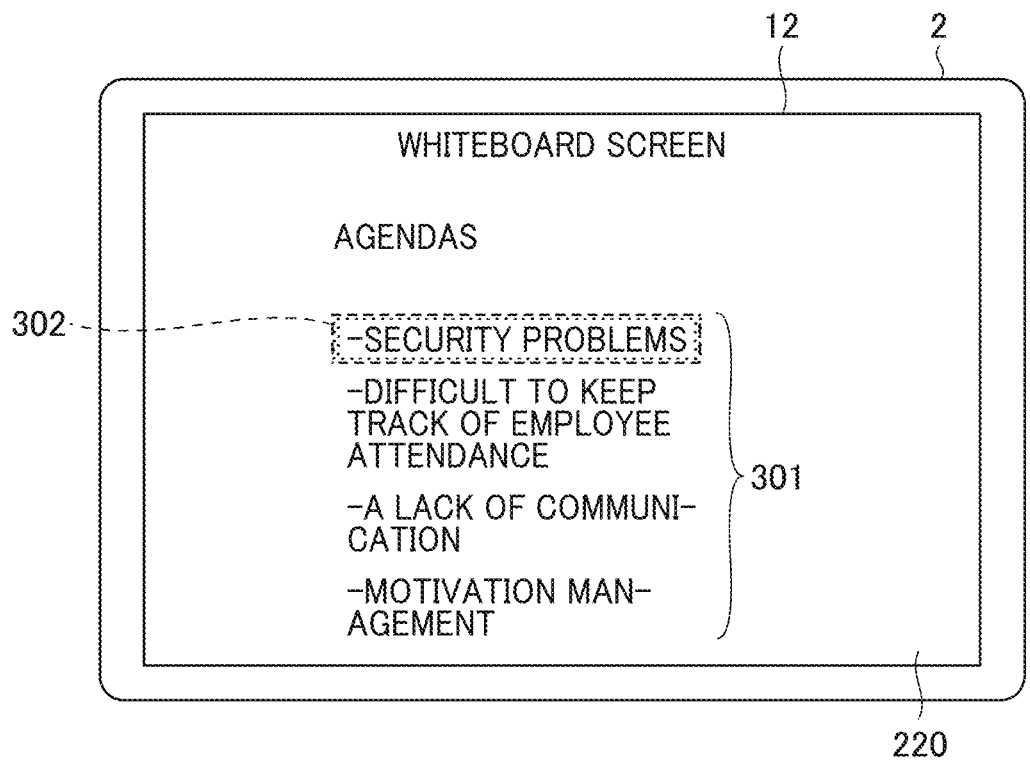
FIG. 5A and FIG. 5B are diagrams each illustrating how a comment is input, according to the present embodiment.

Display Example of Comment:

Display examples of the detailed comment are described with reference to FIG. 5 (FIG. 5A and FIG. 5B) to FIG. 9. First, FIG. 5A is a diagram illustrating how a comment is input, according to the present embodiment. For example, a set of character strings 301 is input according to a user operation in a meeting or a conference. The set of character strings 301 may be handwriting represented by handwritten data. In addition, a part of the set of the character strings 301 is highlighted with a marker 302. The marker is used to make an arbitrary object stand out by a translucent colored stroke. The comment control unit 24 causes the display control unit 23 to display a comment dialog 303 in response to the input corresponding to the marker 302.

Figure 5B:
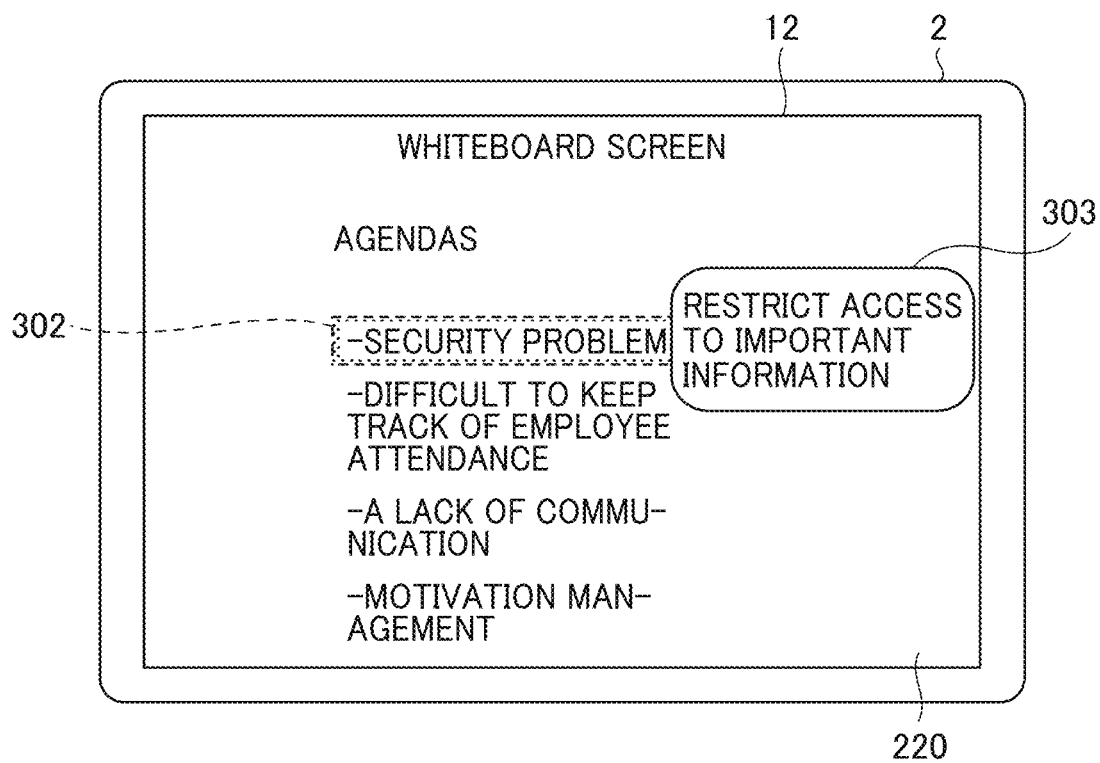

FIG. 5B is a diagram illustrating a screen including an example of the comment dialog 303. In the example, the user inputs "RESTRICT ACCESS TO IMPORTANT INFORMATION" in the comment dialog 303. In other words, the comment is input in accordance with the input of predetermined hand drafted data (marker 302).

Note that a method of inputting comment is based on an operation method of the display apparatus 2. As another input method, the user presses a button for comment to designate a position corresponding to an input destination. As still another input method, after the display apparatus 2 displays the comment dialog 303, a user inputs a comment.

After the user input the comment and closes the comment dialog 303, the comment icon 9 is displayed, for example, at an upper left of the marker 302. In other words, when the comment is input according to the comment input method using the marker 302, the position of the comment icon 9 is somewhere around the marker 302. The position of the comment icon 9 may be at an upper right, a lower left, or a lower right of the marker 302, for example.

Figure 6:
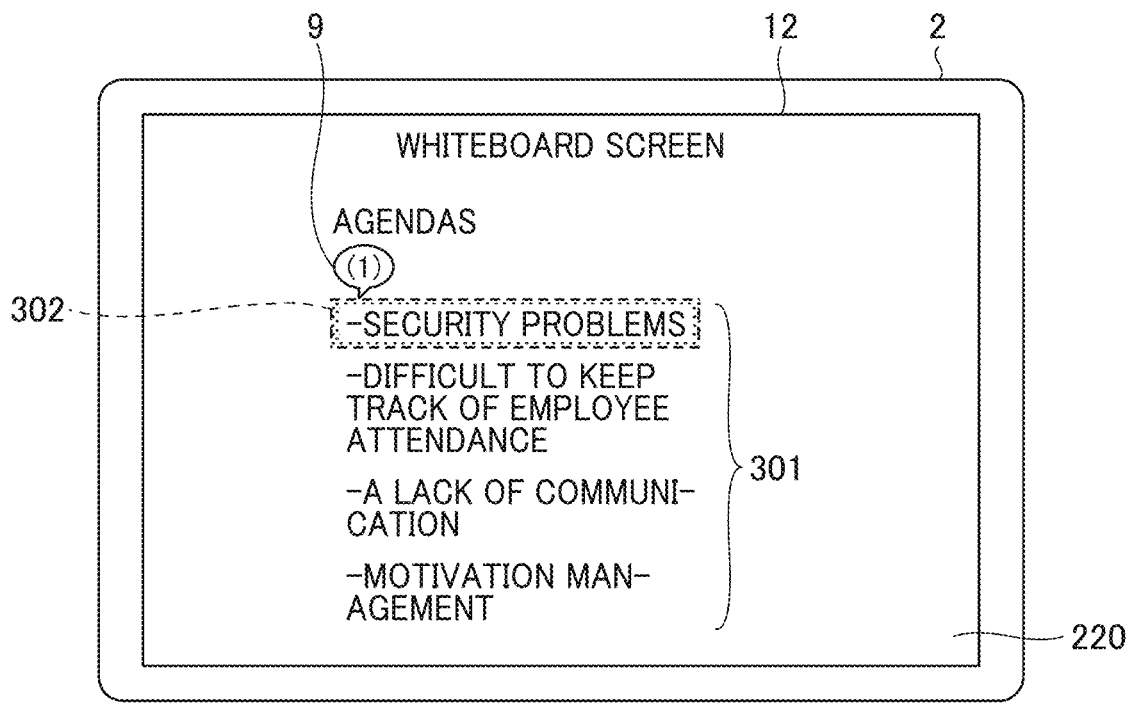
FIG. 6 is a diagram illustrating an example of a screen including a comment icon, according to the embodiment of the disclosure.

FIG. 6 is a diagram illustrating an example of a screen including the comment icon 9 according to the first embodiment. The position of the comment icon 9 is changeable by dragging the comment icon 9 while pressing and holding the comment icon 9 with the input device 291.

With Table 2, the comment information corresponding to FIG. 6 is indicated.

TABLE 2

| COMMENT ID | X COORDINATE | Y COORDINATE | DETAILED COMMNET |
| --- | --- | --- | --- |
| c001 | 200 | 200 | s001 (RESTRICT ACCESS TO IMPORTANT INFORMATION) |
| ... | ... | ... | ... |

In Table 2, a single comment corresponding to the comment icon 9 of FIG. 6 is registered.

A description is given below of the comment section 11 that is displayed when the user presses the comment icon 9 on the screen illustrated in FIG. 6.

Figure 7:
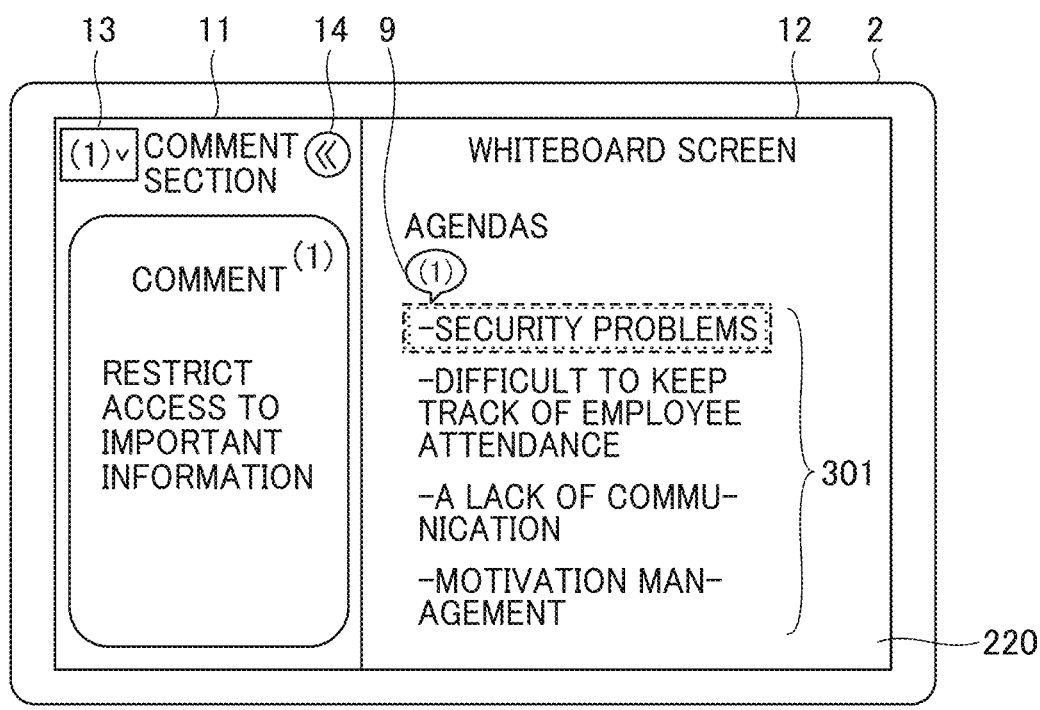
FIG. 7 is a diagram illustrating an example of a screen including a comment section that is displayed when the comment icon is pressed according to a user operation, according to the embodiment of the disclosure.

FIG. 7 is a diagram illustrating an example of a screen including the comment section 11 that is displayed when the comment icon 9 is pressed, according to the present embodiment. When the user presses the comment icon 9, the operation receiving unit 26 receives the pressing, refers to the comment information in Table 2, and identifies the comment ID based on the contact position of the input device 291. The operation receiving unit 26 transmits to the comment control unit 24 the comment ID with a notification indicating that the comment icon 9 has been pressed.

The comment control unit 24 determines whether the comment section 11 is being (currently) displayed or not. When the comment section 11 is not being (currently) displayed, the comment control unit 24 refers to the comment information in Table 2 for a position that is associated with the comment ID corresponding to the comment icon 9, which is pressed, and determines whether the position of the comment icon 9 is on the right or on the left of the display 220 with respect to the middle. The determination is made based on the number of resolution pixels of the screen having a size (horizontal width) of the display 220 and based on whether the position of the comment icon 9 is on the right or left of the screen from the center line (middle) of the screen. For example, in case of the resolution of the screen being 1280×1024 pixels (super extended graphics array (SXGA)), it is determined that the comment icon 9 is on the left of the screen when the position of the comment icon 9 (the lower left point of the rectangle surrounding the comment icon 9) is within a range from 0 to 640 pixels counted from the left end of the screen. On the other hand, it is determined that the comment icon 9 is on the right of the screen when the position of the comment icon 9 is within a range from 641 to 1280 pixels. When the resolution of the screen is changed, the determination whether the comment icon 9 is on the left or the right of the screen is made based on the numerical value of the resolution after the change.

In FIG. 7, the comment icon 9 is determined to be on the left of the screen, the display control unit 23 displays the comment section 11 on the left (left end) of the display 220. In other words, the display control unit 23 displays the comment section 11 in an area close to the comment icon 9 of which selection has been received. The above-described processing corresponds to steps S2 and S4 in a flowchart of FIG. 19, which is described later. In the following description, a corresponding step number in FIG. 19 or FIG. 20 is assigned to each description of process.

The comment control unit 24 prepares the comment section 11 having a predetermined width, for example, from the left of the display 220. The display control unit 23 changes a position of the set of character strings 301, which is currently displayed, to the right as a whole by the width of the comment section 11. In other words, the display control unit 23 change a size of the display range 12 to be smaller than the one before the comment section 11 is displayed, by reducing in a direction that is opposite to the comment section 11.

Figure 19:
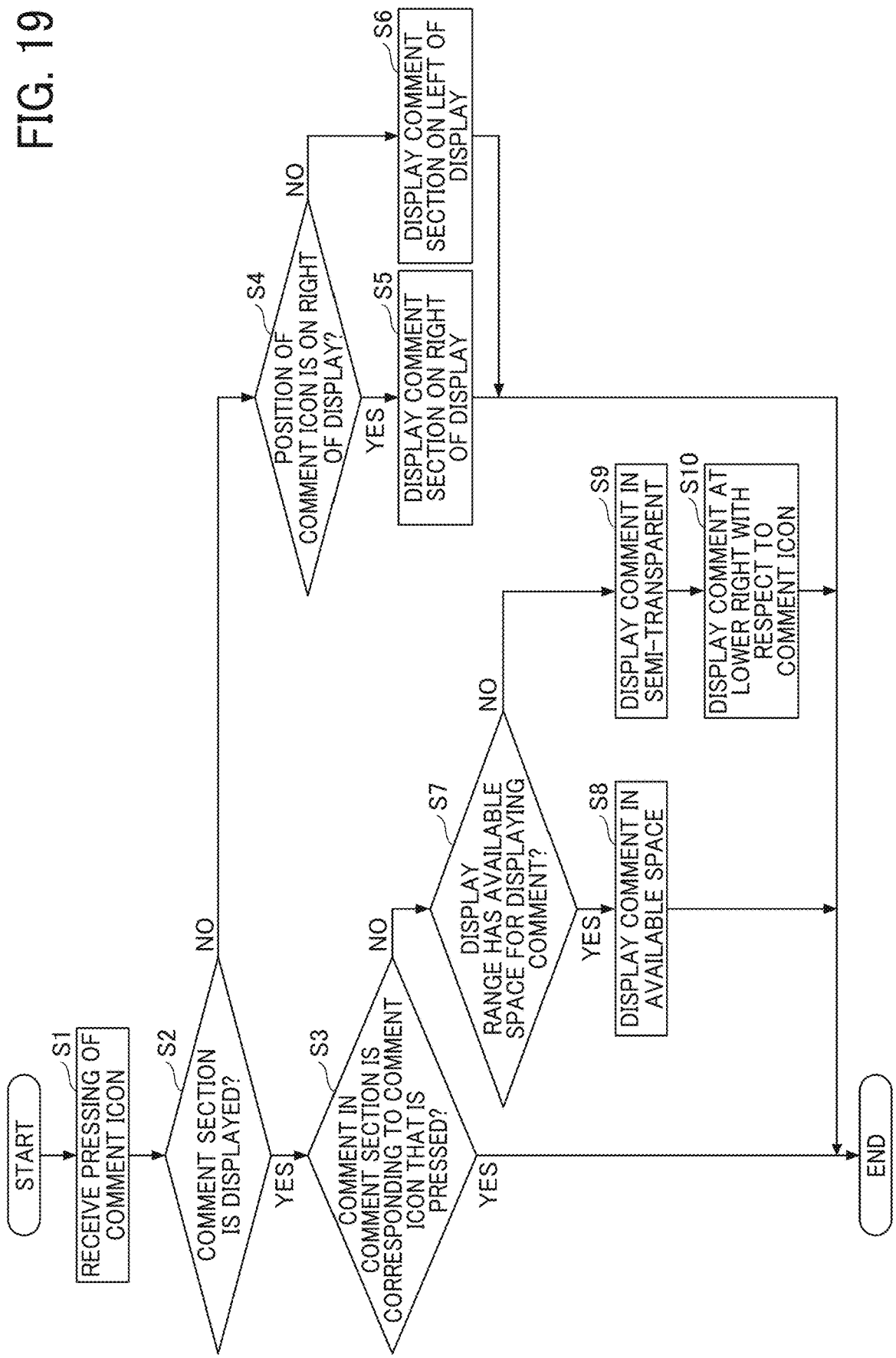
FIG. 19 is a flowchart illustrating an example of a process in which the display apparatus displays the comment section and the detailed comment, according to the embodiment of the disclosure.
Figure 20:
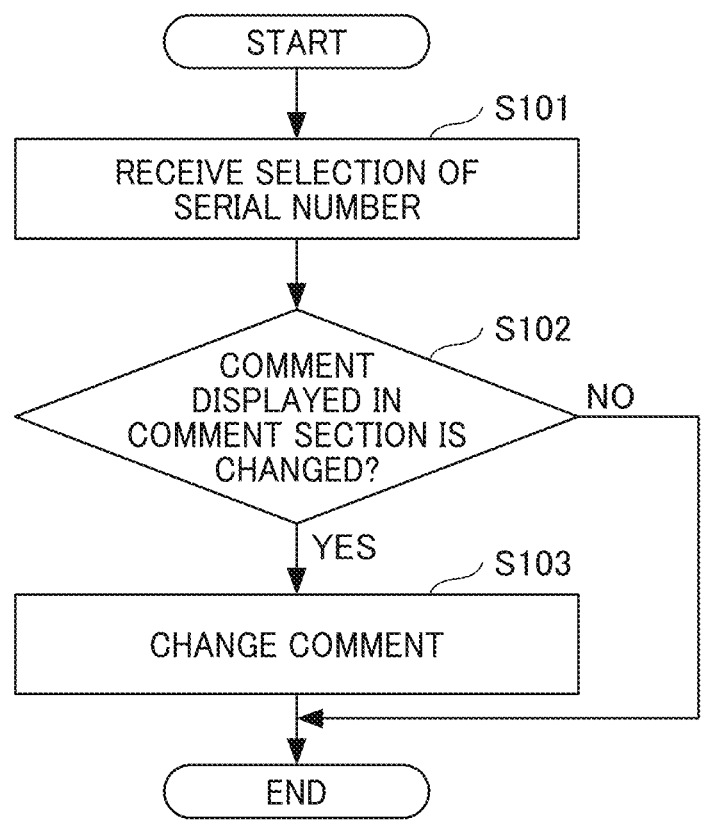
FIG. 20 is a flowchart illustrating a process of displaying the detailed comment when a serial number of a comment displayed with respect to the pull-down menu is pressed, according to the embodiment of the disclosure.

The comment control unit 24 acquires the detailed comment associated with the comment icon 9 from the storage unit 29, and the display control unit 23 displays the detailed comment in the comment section 11 (FIG. 19: step S6).

By displaying the comment section 11 as described above, the detailed comment and the comment section 11 are arranged to be displayed where the set of character strings 301 is not arranged to be displayed. This prevents that a part of or all of the detailed comment is displayed over a part of or all of the set of character strings 301, and prevents an inconvenience situation for the user, such as difficulty in viewing.

The comment section 11 includes a pull-down menu 13. When the number of the comment icons 9 in the display range 12 is two or more, the pull-down menu 13 receives a user selection indicating which detailed comment to be displayed in the comment section 11.

The comment section 11 includes a close button 14. The close button 14 receives a user operation for closing the comment section 11.

Note that the width of the comment section 11 may be determined in advance or may be optimized in accordance with the width of the comment. The process of displaying the detailed comment varies depending on whether the comment is handwritten data or a character string.

When the detailed comment is handwritten data, the comment control unit 24 determines whether the handwritten data fits with a predetermined minimum width of the comment section 11 to be displayed. The predetermined minimum width of the comment section 11 may be, for example, one fourth of the width of the display 220. When the handwritten data does not fit with the predetermined minimum width of the comment section 11, the comment control unit 24 determines whether the handwritten data is fit with a predetermined maximum width of the comment section 11 to be displayed. The predetermined maximum width of the comment section 11 may be, for example, one third of the width of the display 220. In a case where the handwritten data fits with the predetermined maximum width of the comment section 11, the width of the comment section 11 is determined in accordance with the width of the handwritten data. In this case, the width of the comment section 11 is substantially equal to the width of the handwritten data.

When the handwritten data does not fit with the predetermined maximum width of the comment section 11, the comment control unit 24 reduces the handwritten data so that the handwritten data fits with the predetermined maximum width of the comment section 11. In case that the detailed comment is displayed in small and difficult to be viewed, the user may manually change the width of the comment section 11.

When the detailed comment is a character string, the comment control unit 24 adjust the detailed comment to the predetermined minimum width of the comment section 11. In other words, the detailed comment of character string has a line break in accordance with the width of the comment section 11 to be displayed.

In addition, as illustrated in FIG. 7, when the comment section 11 is displayed the display range 12 is narrowed. When the set of character strings 301 does not fit in the display range 12 due to the display range 12 being narrowed, the display control unit 23 may reduce a size of the set of character strings 301, for example. In a case where the comment section 11 is displayed on the left of the display 220, the head of the set of character strings 301 remains in the display range 12 (in a case of horizontal writing from left to right), and thus it is not always necessary to reduce the size. In this case, a part of the set of character string 301 that is a part out of the display range 12 is temporarily hidden.

In alternative to reducing the size of the set of character strings 301, if there is no handwritten data in the input-available range on the right of the display range 12, the comment control unit 24 may temporarily use the corresponding area. In this case, a part of the set of character strings 301 that is a part out of the input-available range is not displayed, but continues to be present in a hidden state.

A description is given below a case where the comment section 11 is displayed on the right of the display 220. When the comment section 11 is displayed on the right of the display 220, the detailed comment may be displayed in substantially the same manner as described above.

Figure 8:
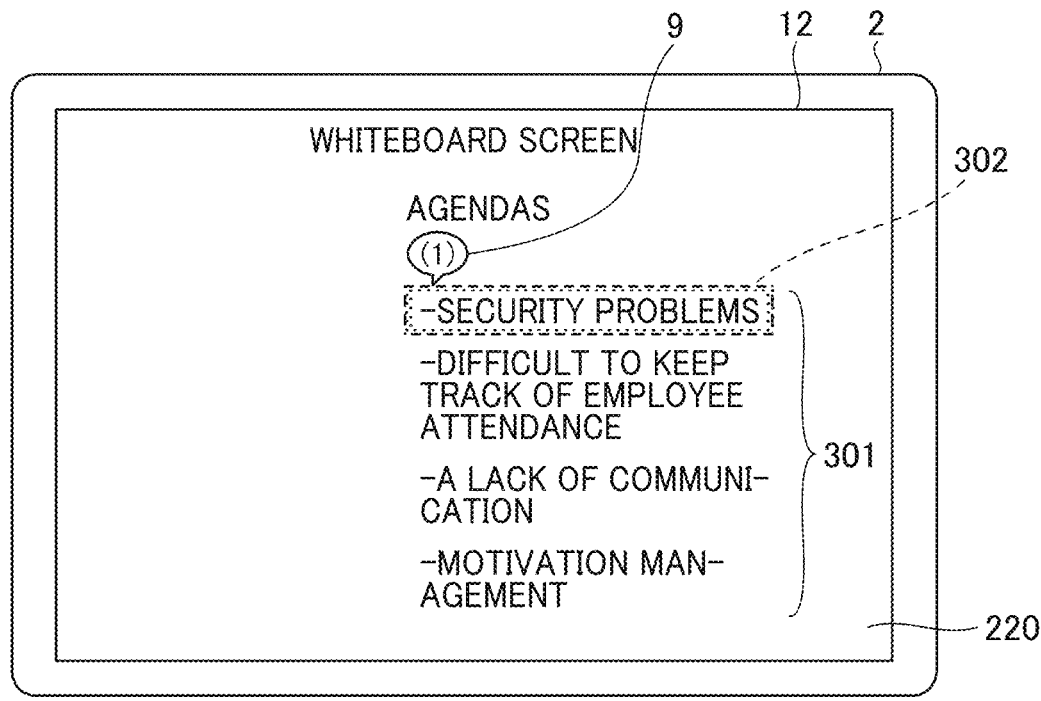
FIG. 8 is a diagram illustrating an example of a screen including the comment icon that indicates a presence of a comment input according to a user operation, according to the embodiment of the disclosure.

FIG. 8 is a diagram illustrating an example of a screen including the comment icon 9 that indicates a presence of a comment input according to a user operation. In the following description on FIG. 8, the differences from FIG. 7 are described.

For example, the set of character strings 301 is input according to a user operation in a meeting or a conference. The set of character strings 301 may be handwriting represented by handwritten data. Further, the user has input a comment in proximity to the set of character string 301 in a manner similar to FIG. 5 (with marker 302). In FIG. 8, the comment icon 9 is displayed at an upper left of the marker 302.

With Table 3, the comment information corresponding to FIG. 8 is indicated.

TABLE 3

| COMMENT ID | X COORDINATE | Y COORDINATE | DETAILED COMMNET |
|---|---|---|---|
| c001 | 1100 | 200 | s001 (RESTRICT ACCESS TO IMPORTANT INFORMATION) |
| ... | ... | ... | ... |

The comment information in Table 3 is the same as that in Table 2 except for the X coordinate.

A description is given below of the comment section 11 that is displayed when the user presses the comment icon 9 on the screen illustrated in FIG. 8.

Figure 9:
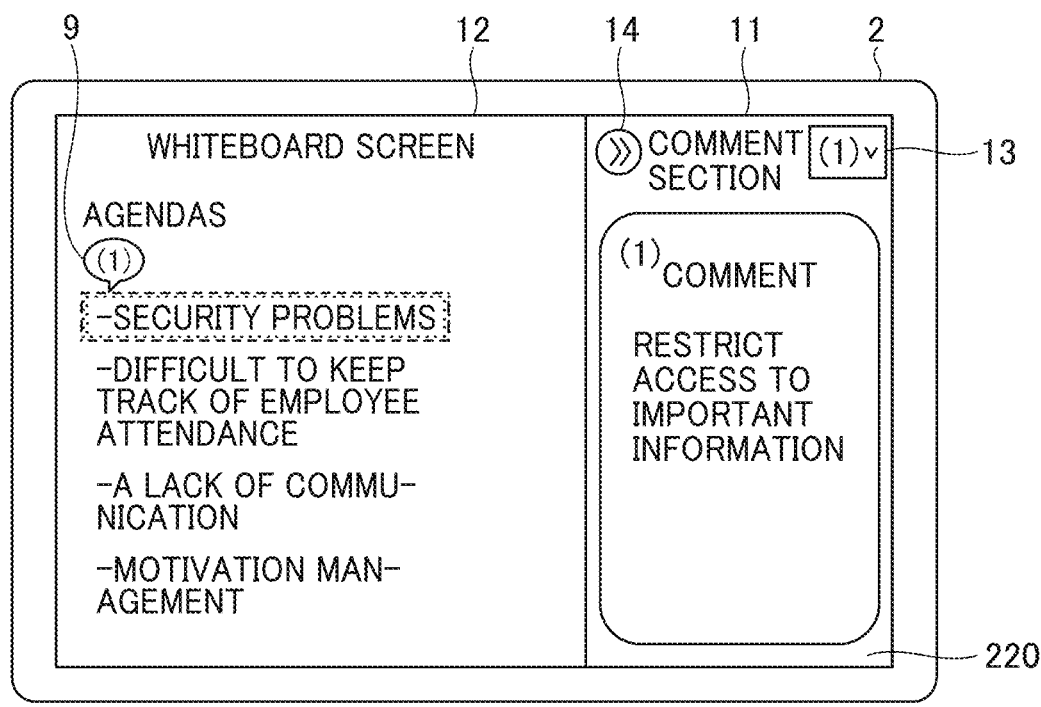
FIG. 9 is a diagram illustrating an example of a screen including the comment section that is displayed when the comment icon is pressed according to a user operation, according to an embodiment of the disclosure.

FIG. 9 is a diagram illustrating an example of a screen including the comment section 11 that is displayed when the comment icon 9 is pressed, according to the present embodiment. When the user presses the comment icon 9, the operation receiving unit 26 receives the pressing, refers to the comment information in Table 3, and identifies the comment ID based on the contact position of the input device 291. The operation receiving unit 26 transmits to the comment control unit 24 the comment ID with a notification indicating that the comment icon 9 has been pressed.

The comment control unit 24 determines whether the comment section 11 is being (currently) displayed or not. When the comment section 11 is not being (currently) displayed, the comment control unit 24 refers to the comment information in Table 3 for a position (X coordinate) that is associated with the comment ID corresponding to the comment icon 9, which is pressed, and determines whether the position of the comment icon 9 is on the right or on the left of the display 220 with respect to the middle. The determination method may be in substantially the same manner as that in the example of FIG. 7.

In FIG. 9, the comment icon 9 is determined to be on the right of the screen, the display control unit 23 displays the comment section 11 on the right of the display 220 (FIG. 19: step S2, step S4). The comment control unit 24 prepares the comment section 11 having a predetermined width, for example, from the right (right end) of the display 220. The display control unit 23 changes a position of the set of character strings 301, which is currently displayed, to the left as a whole by the width of the comment section 11.

The comment control unit 24 acquires the detailed comment associated with the comment icon 9 from the comment information in Table 3, and the display control unit 23 displays the detailed comment in the comment section 11 (FIG. 19: step S5).

By displaying the comment section 11 as described above, the detailed comment and the comment section 11 are arranged to be displayed where the set of character strings 301 is not arranged to be displayed. This prevents that a part of or all of the detailed comment is displayed over a part of or all of the set of character strings 301, and prevents an inconvenience situation for the user, such as difficulty in viewing.

Addition of Comment:

A description is given below of a case w % here the user adds a comment.

Figure 10:
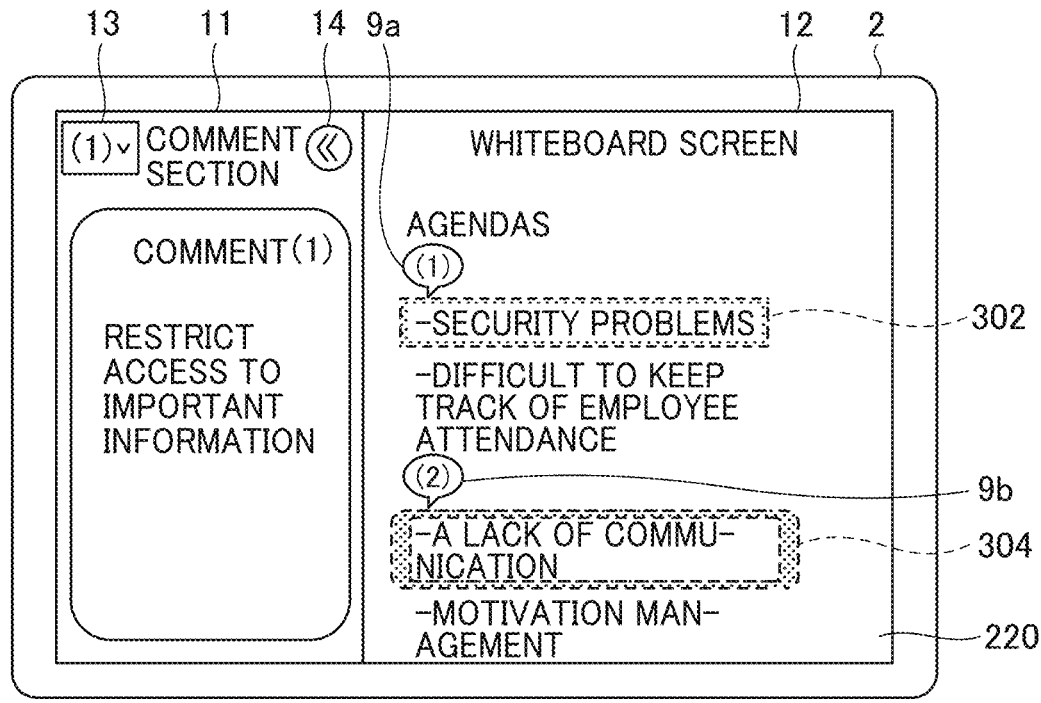
FIG. 10 is a diagram illustrating an example of a screen including another comment icon that is added with respect to the screen of FIG. 7, according to the embodiment of the disclosure.

FIG. 10 is a diagram illustrating an example of a screen including a comment icon 9 that is added with respect to the screen of FIG. 7 displayed by the display apparatus 2. The comment may be input in substantially the same manner as in FIG. 5. When the comment icons 9 are distinguished from each other, alphabets a and b are used with respect to the comment icons 9. A comment icon 9a is associated with a comment input with handwriting (user hand drafted input) corresponding to the marker 302. A comment icon 9b is associated with a comment input with handwriting (user hand drafted input) corresponding to a marker 304.

By adding a comment, one comment (one record) is newly registered in the comment information of the storage unit 29.

TABLE 4

| COMMENT ID | X COORDINATE | Y COORDINATE | DETAILED COMMNET |
|---|---|---|---|
| c001 | 200 | 200 | s001 (RESTRICT ACCESS TO IMPORTANT INFORMATION) |
| c002 | 200 | 600 | s002 (INCREASE OPPORTUNITIES SUCH AS MEETINGS TO EXCHANGE INFORMATION) |
| ... | ... | ... | ... |

With Table 4, the comment information corresponding to FIG. 10 is indicated. In Table 4, two comments are registered.

When a plurality of comments are input, the comment control unit 24 displays, for example, serial numbers for identifying each of the comments with the pull-down menu 13 in a selectable manner. Each serial number is also displayed with a corresponding one of the comment icons 9, and this allows the user to know the correspondence between each comment icon 9 and the corresponding serial number displayed with the pull-down menu 13. The serial number may be the last digit of the comment ID, or may be separately assigned to each line (record) of the comment information.

Figure 11:
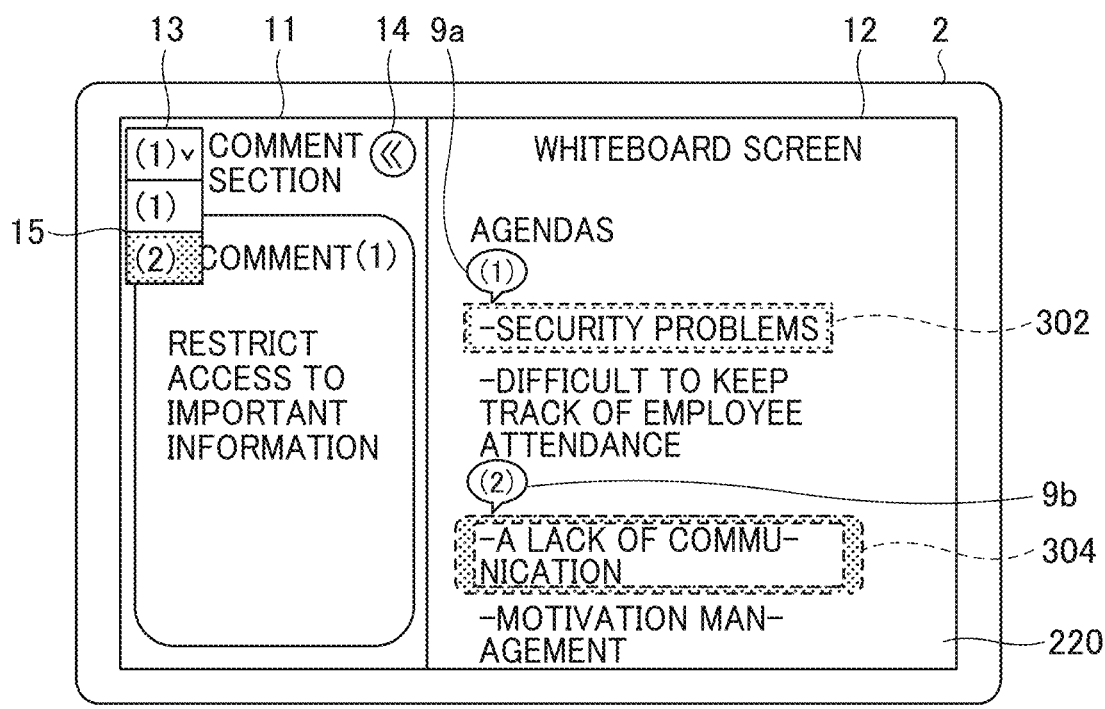
FIG. 11 is a diagram illustrating an example of a screen including a pull-down menu displaying, according to a user operation, a list of serial numbers corresponding to comments, according to the embodiment of the disclosure.

FIG. 11 is a diagram illustrating an example of a screen including the pull-down menu 13 displaying, according to a user operation, a list of serial numbers 15 corresponding to comments. In FIG. 11, the serial numbers ((1), (2)) of two comment icons input on the display 220 are displayed. The user selects a serial number corresponding to each comment in the pull-down menu 13 by the input device 291. The operation receiving unit 26 receives a selection of the serial number corresponding to the comment, and the display control unit 23 changes the brightness or color of the serial number (FIG. 20: step S101).

Note that the pull-down menu 13 is limited to display the serial numbers corresponding to the comments displayed in the display range 12 (a range viewable by the user of the entire display 220). This is because the comment desired by the user to be displayed in the comment section 11 is generally a comment that is in the display range 12. However, the comment control unit 24 may display the serial numbers corresponding to all comments being within the input-available range on the pull-down menu 13 according to a user operation.

Figure 12:
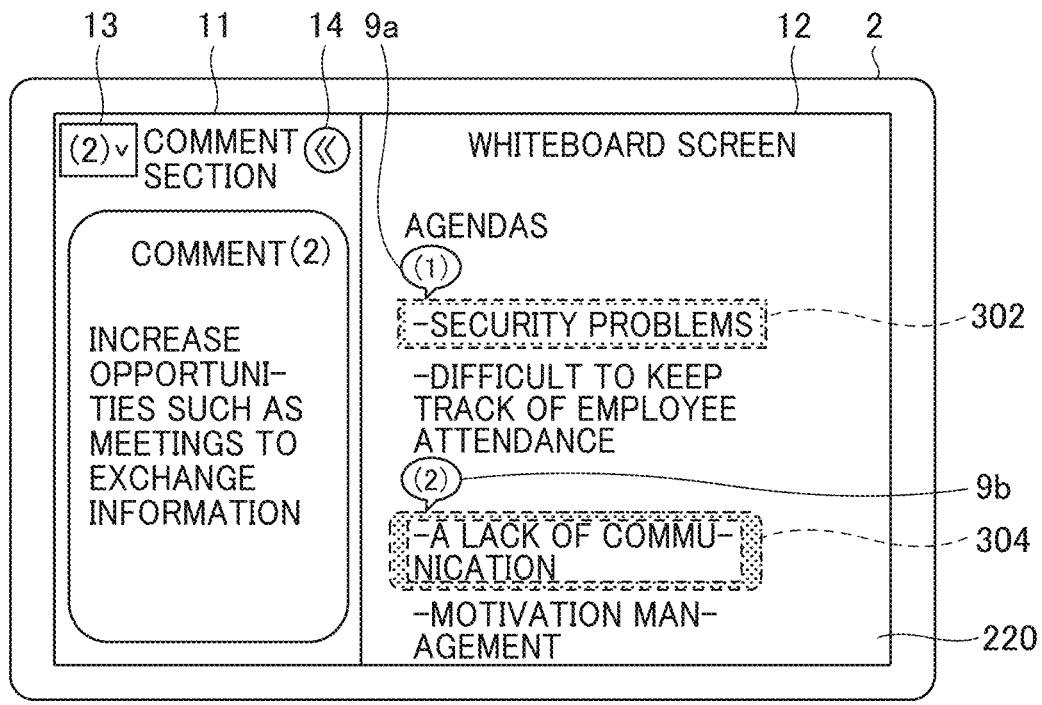
FIG. 12 is a diagram illustrating an example of a screen including a comment selected with the pull-down menu, according to the embodiment of the disclosure.

FIG. 12 is a diagram illustrating an example of a screen including a comment selected with the pull-down menu 13. The operation receiving unit 26 notifies the comment control unit 24 of the selected serial number of the comment, and the comment control unit 24 acquires the detailed comment identified by the serial number of the comment from the storage unit 29. The display control unit 23 displays the detailed comment in the comment section 11 (FIG. 20: steps S102 and S103).

Figure 13:
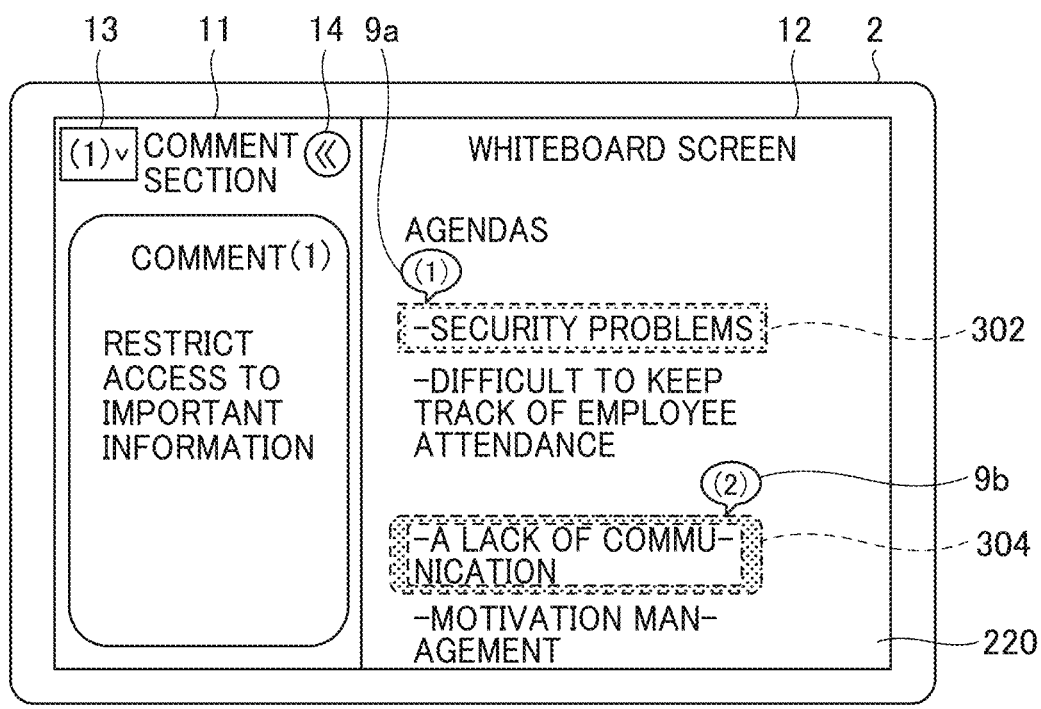
FIG. 13 is a diagram illustrating an example of a screen including a comment icon displayed on left of a display and another comment icon displayed on right of the display, according to the embodiment of the disclosure.

As illustrated in FIG. 13, when the comment icons 9 are present on the left and the right of the display 220, the comment section 11 is displayed on the left or the right of the display 220 according to the comment icon 9 selected first. In other words, even when the user selects a serial number of any comment in FIG. 13 with the pull-down menu 13, the comment section 11 does not move to the left or right each time the user selects the serial number.

Simultaneous Display of Plural Comments:

The number of comments available to be displayed in the comment section 11 at the same time is limited (for example, one comment). When the number of comments desired by the user to be displayed at the same time is more than the limited number of comments available to be displayed at the same time, the display apparatus 2 displays a detailed comment at a different position other than in the comment section 11. For example, the display apparatus 2 displays the detailed comment in a blank space of the display range 12.

Figure 14:
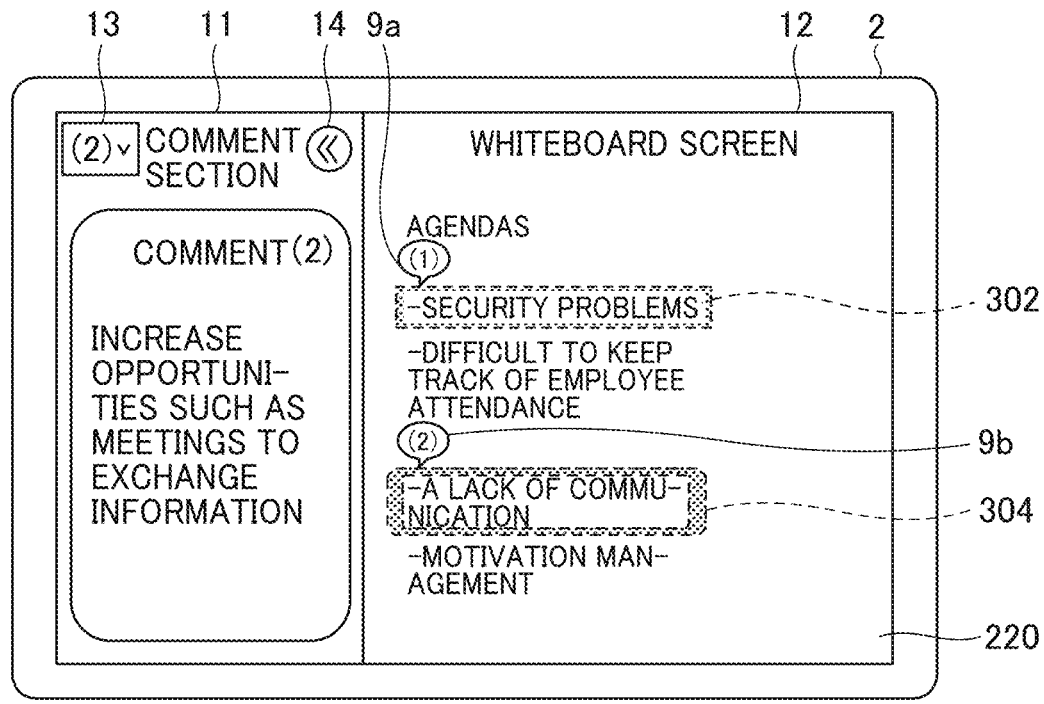
FIG. 14 is a diagram illustrating an example of a screen including the comment section in which a detailed comment is displayed, according to the embodiment of the disclosure.

FIG. 14 is a diagram illustrating an example of a screen including the comment section 11 in which a detailed comment is displayed. The detailed comment in the comment section 11 in FIG. 14 is one that is corresponding to the comment icon 9b. When the comment icon 9a is pressed according to a user operation, the operation receiving unit 26 receives the pressing. The operation receiving unit 26 transmits to the comment control unit 24 a notification indicating that the comment icon 9a has been pressed. The comment control unit 24 determines whether the comment section 11 is currently displayed (FIG. 19: steps S1 and S2).

The comment control unit 24 determines whether the comment ID of the pressed comment icon 9a matches the comment ID of the comment displayed in the comment section 11, and when the comment IDs do not match, acquires the detailed comment corresponding to the comment icon 9a, which is pressed, from the storage unit 29 (FIG. 19: step S3).

Figure 15:
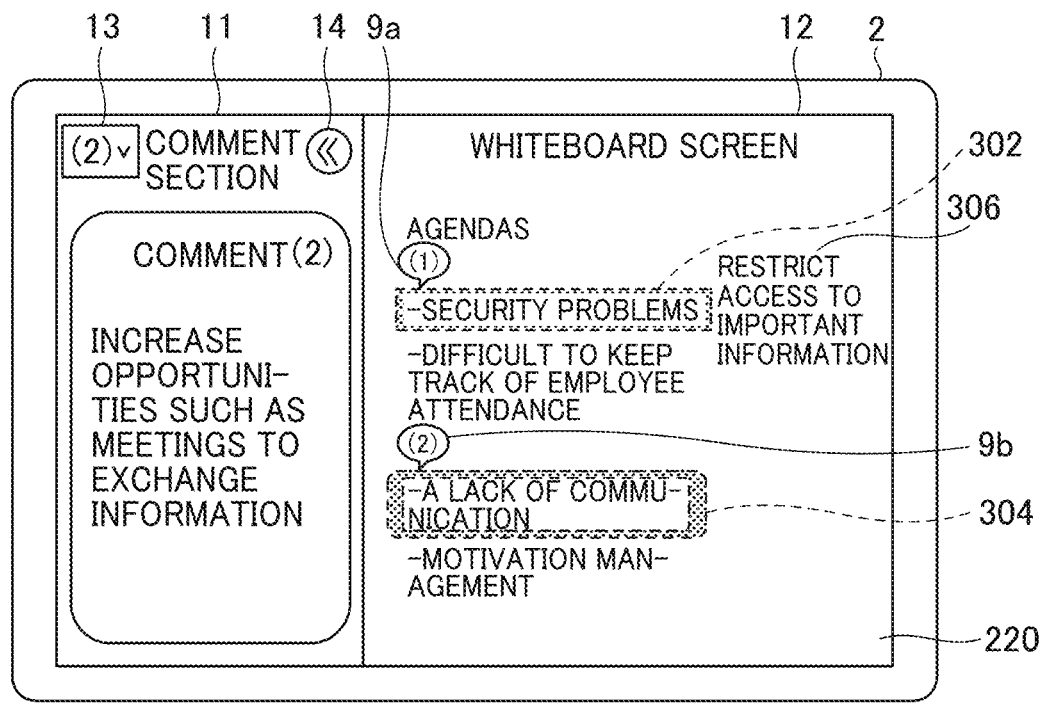
FIG. 15 is a diagram illustrating an example of a screen including a detailed comment displayed in a blank space, according to the embodiment of the disclosure.

Then, the comment control unit 24 determines whether the detailed comment is to be displayed in the blank space of the display 220. When the blank space is available for displaying the detailed comment, the display control unit 23 displays the detailed comment in the blank space as illustrated in FIG. 15 (FIG. 19: steps S7 and S8). A method of determining a presence or absence of a blank space is described later with reference to FIG. 18.

In this way, the display apparatus 2 simultaneously display a plurality of comments using the comment section 11 and blank space in the display range 12.

Figure 16:
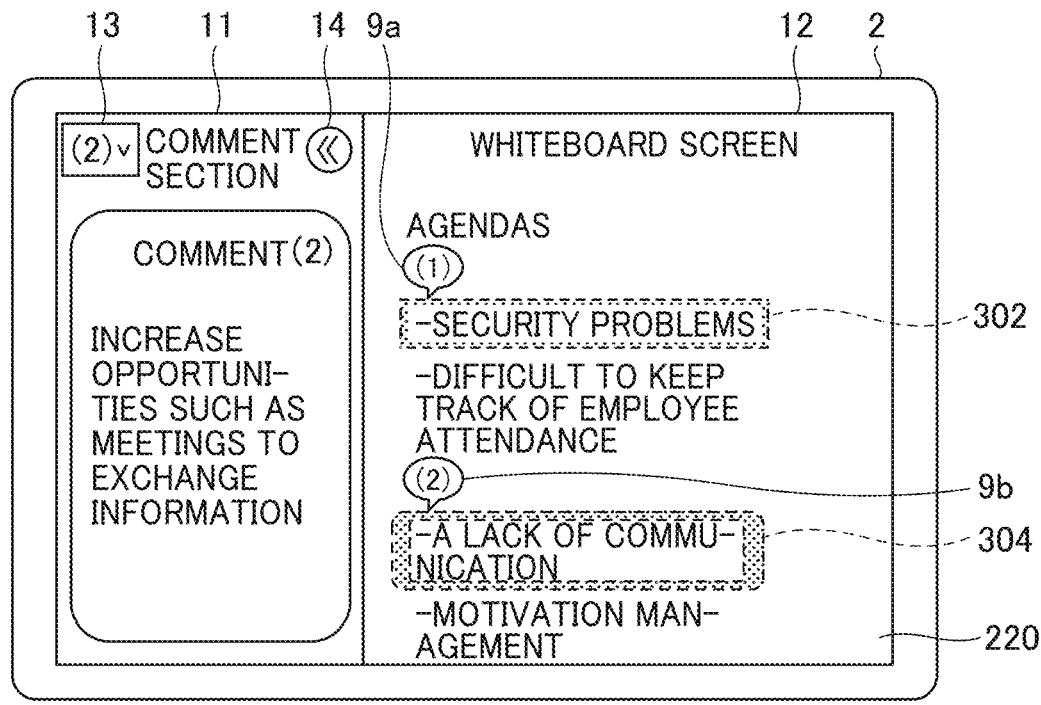
FIG. 16 is a diagram illustrating an example of a screen of which a display range does not have a space sufficient for displaying a detailed comment, according to the embodiment of the disclosure.

FIG. 16 is a diagram illustrating an example of a screen of which display content is substantially the same as the one illustrated in FIG. 14, but the screen does not have a blank space sufficient for displaying a detailed comment in the display range 12. When there is no blank space sufficient for displaying the detailed comment on the display 220, the comment control unit 24 determines an area under the pressed comment icon 9a as a display position of the detailed comment.

Figure 17:
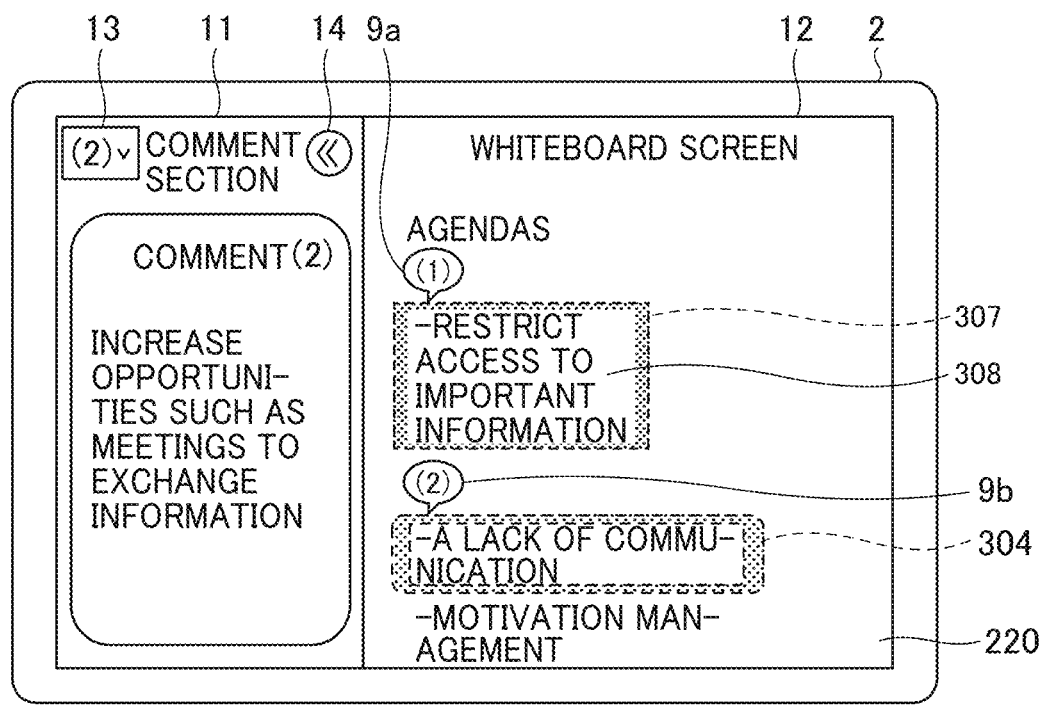
FIG. 17 is a diagram illustrating an example of a screen including the detailed comment displayed in a blank space in case the display range does not have a space sufficient for displaying the detailed comment, according to the embodiment of the disclosure.

As illustrated in FIG. 17, the comment control unit 24 increases density of objects in an area 308 for displaying the detailed comment and displays the detailed comment, for example, in a semi-transparent manner (FIG. 19: steps S7, S9, and S10). In the example of FIG. 17, a detailed comment 307 corresponding to the comment icon 9a is displayed in a semi-transparent manner, and the set of character strings 301 is viewable through the detailed comment 307, although it is difficult to be illustrated in the drawing. Note that the density is also referred to as saturation or chroma, and increasing the density means, for example, decreasing the saturation or the chroma. The display control unit 23 may simply increase a values of each of Red, Green, and Blue (RGB).

The area 308 in which the detailed comment is displayed is preferably determined according to a size of the detailed comment. When the detailed comment is represented by handwritten data, for example, the area 308 is defined by a circumscribed rectangle surrounding the detailed comment. In a case where the detailed comment is a character string, for example, a width of the area 308 may be the same as that of the display range 12, and a height of the area 308 is determined according to the number of characters.

In this way, even when there is no blank space sufficient for displaying the detailed comment in the display range 12, the display apparatus 2 displays the detailed comment in the display range 12 with the objects being visually recognizable.

The detailed comment displayed in the display range 12 is deleted by the display control unit 23 when the comment icon 9a is pressed.

Figure 18:
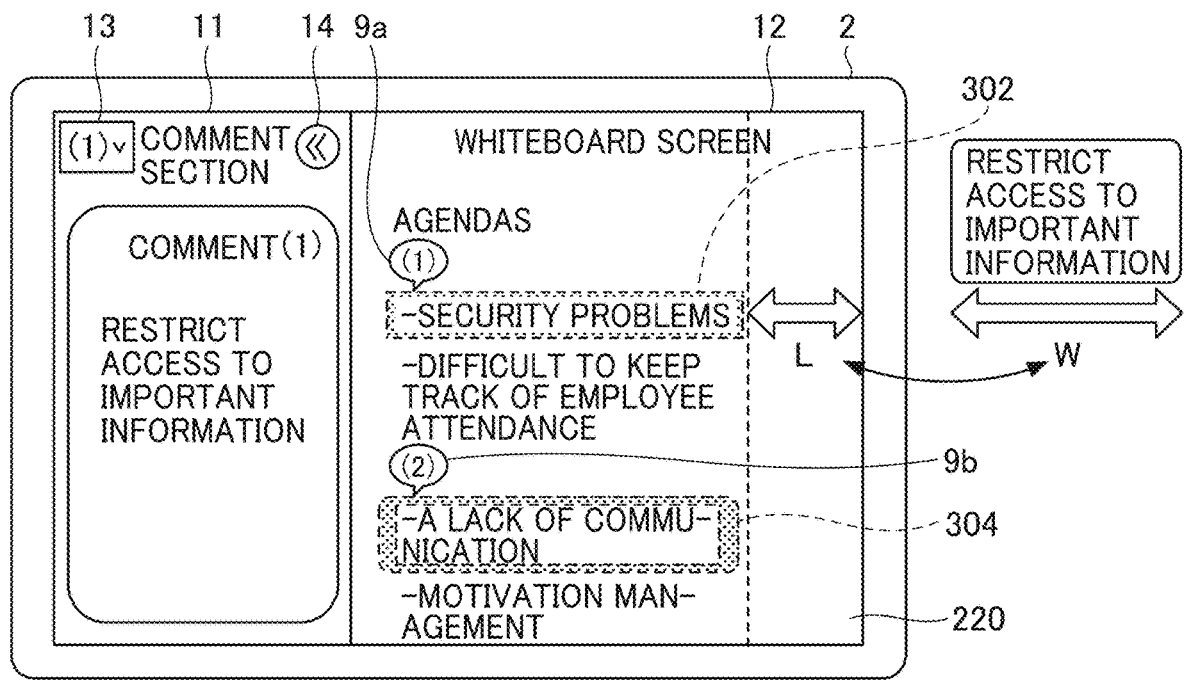
FIG. 18 is a diagram for describing a method of determining a presence or absence of a blank space for displaying the detailed comment, according to the embodiment of the disclosure.

FIG. 18 is a diagram for describing a method of determining the presence or absence of a blank space for displaying the detailed comment. The comment control unit 24 compares a distance L that is from an edge of the display 220 to an edge of an object with a width W of the detailed comment. When the comment section 11 is on the left of the display 220, the end of the display 220 is the right end, and when the comment section 11 is on the right of the display 220, the end of the display 220 is the left end. When the comment section 11 is on the left of the display 220, the end of the object is the right end, and when the comment section 11 is on the right of the display 220, the end of the object is the left end.

In case of a detailed comment being represented by handwritten data, when the distance L is equal to or greater than or equal to the width W, the comment control unit 24 determines that there is a sufficient blank space. Otherwise, the comment control unit 24 determines that there is no sufficient blank space. Even when the distance L is not equal to or greater than the width W, the comment control unit 24 may determine whether there is a sufficient blank space by reducing a size of the detailed comment. Preferably, the reducing has a limitation on the reduction ratio.

When the detailed comment is a character string, the character string generally fit in a blank space by inserting line feeds. For this reason, when the distance L is equal to or greater than a threshold value, the comment control unit 24 determines that there is a blank space. The threshold value is set because it is difficult to read a detailed comment having a large number of line feeds.

Process:

FIG. 19 is a flowchart illustrating an example of a process in which the display apparatus 2 displays the comment section 11 and the detailed comment according to the present embodiment. The process illustrated in FIG. 19 starts when the user presses the comment icon 9 with the input device 291 (S1). The operation receiving unit 26 identifies the pressed comment icon 9 based on the coordinates at which the input device 291 comes into contact with the display 220.

The comment control unit 24 determines whether the comment section 11 is currently displayed or not (S2). The comment section 11 is displayed by the comment control unit 24, and whether the comment section 11 is displayed or not is managed by the comment control unit 24.

In a case where the determination of step S2 is Yes, the comment control unit 24 determines whether a detailed comment that is currently displayed in the comment section 11 matches the one corresponding to the pressed comment icon 9 (S3). The comment ID displayed in the comment section 11 is managed by the comment control unit 24.

When the determination in step S3 is Yes, this means that the detailed comment has already been displayed, or is currently displayed, and the comment control unit 24 does not do anything, and the process ends.

When the determination of the step S3 is No, a comment different from the comment being displayed in the comment section 11 is to be displayed. In other words, the detailed comment is to be displayed in the display range 12 in addition to the comment section 11. The comment control unit 24 determines whether there is an available space for displaying the comment on the display 220 (S7).

When the determination of step S7 is Yes, the comment control unit 24 displays the detailed comment in the available space (S8).

When the determination of step S7 is No, the comment control unit 24 displays the comment in semi-transparent (S9). By doing so, in case that the comment overlaps an object other than the comment, the object is easily visible. The comment control unit 24 may further increase the density of the object overlapped with an area in which the detailed comment is displayed (the area below the comment icon 9). Alternatively, the comment control unit 24 may increase the density of the entire display range 12.

The display control unit 23 displays the detailed comment, for example, at the lower right with respect to the comment icon 9 (S10).

When the determination of step S2 is No, the comment control unit 24 determines whether the position of the pressed comment icon 9 is on the right of the display 220 with respect to the center (S4).

When the determination of step S4 is Yes, the comment control unit 24 determines that the comment section 11 is to be displayed on the right of the display 220, and the display control unit 23 displays the comment section 11 on the right of the display 220 (S5). The display control unit 23 displays the detailed comment determined based on the position of the pressed comment icon 9 in the comment section 11.

When the determination of step S4 is No, the comment control unit 24 determines that the comment section 11 is to be displayed on the left of the display 220, and the display control unit 23 displays the comment section 11 on the left of the display 220 (S6). The display control unit 23 displays the detailed comment determined based on the position of the pressed comment icon 9 in the comment section 11.

In the case of steps S5 and S6, the comment control unit 24 refers to the storage unit 29 and identifies the comment icon 9 in the display range 12. Since the coordinates of the input-available range in the display range 12 are stored in advance, the comment control unit 24 may specify the comment icon 9 being in the range corresponding to the coordinates. The comment control unit 24 sets serial numbers of comments in the display range 12 to the pull-down menu 13. A description is given below of a process performed when a serial number in the pull-down menu 13 is pressed, with reference to FIG. 20.

Displaying Detailed Comment in response to Receiving Pressing Serial Number with Pull-Down Menu:

FIG. 20 is a flowchart illustrating a process of displaying a detailed comment when a serial number of a comment displayed with respect to the pull-down menu 13 is pressed, according to the present embodiment.

The user presses the serial number of the pull-down menu 13 (S101). The operation receiving unit 26 receives the serial number and notifies the comment control unit 24 of the serial number. The comment control unit 24 identifies a comment ID based on the serial number.

The comment control unit 24 determines whether the comment currently displayed in the comment section 11 is changed (S102). Since managing the comment being displayed in the comment section 11, the comment control unit 24 easily determines whether the comment being displayed in the comment section 11 is changed or not.

When the determination of step S102 is No, the comment control unit 24 does not do anything, and the process ends.

When the determination of step S102 is Yes, the comment control unit 24 switches the detailed comment currently displayed in the comment section 11 to the one selected by the user (S103).

As described above, the display apparatus 2 displays the detailed comment in an area dedicated to the detailed comment (comment section 11) without hiding the display range 12.

In addition, the display apparatus 2 displays the comment section 11, in the display screen, a position that is relatively close to a position of the user who presses the comment icon 9, and this allows the user to perform operations with respect to the comment section 11 without changing his or her current position.

The display apparatus 2 may display a comment in the display range 12 besides displaying in the comment section 11.

Second Embodiment

In the present embodiment, a description is given below of a display system 19 in which the display apparatus 2 and a communication terminal 31 communicate with each other via a server 32.

Figure 21:
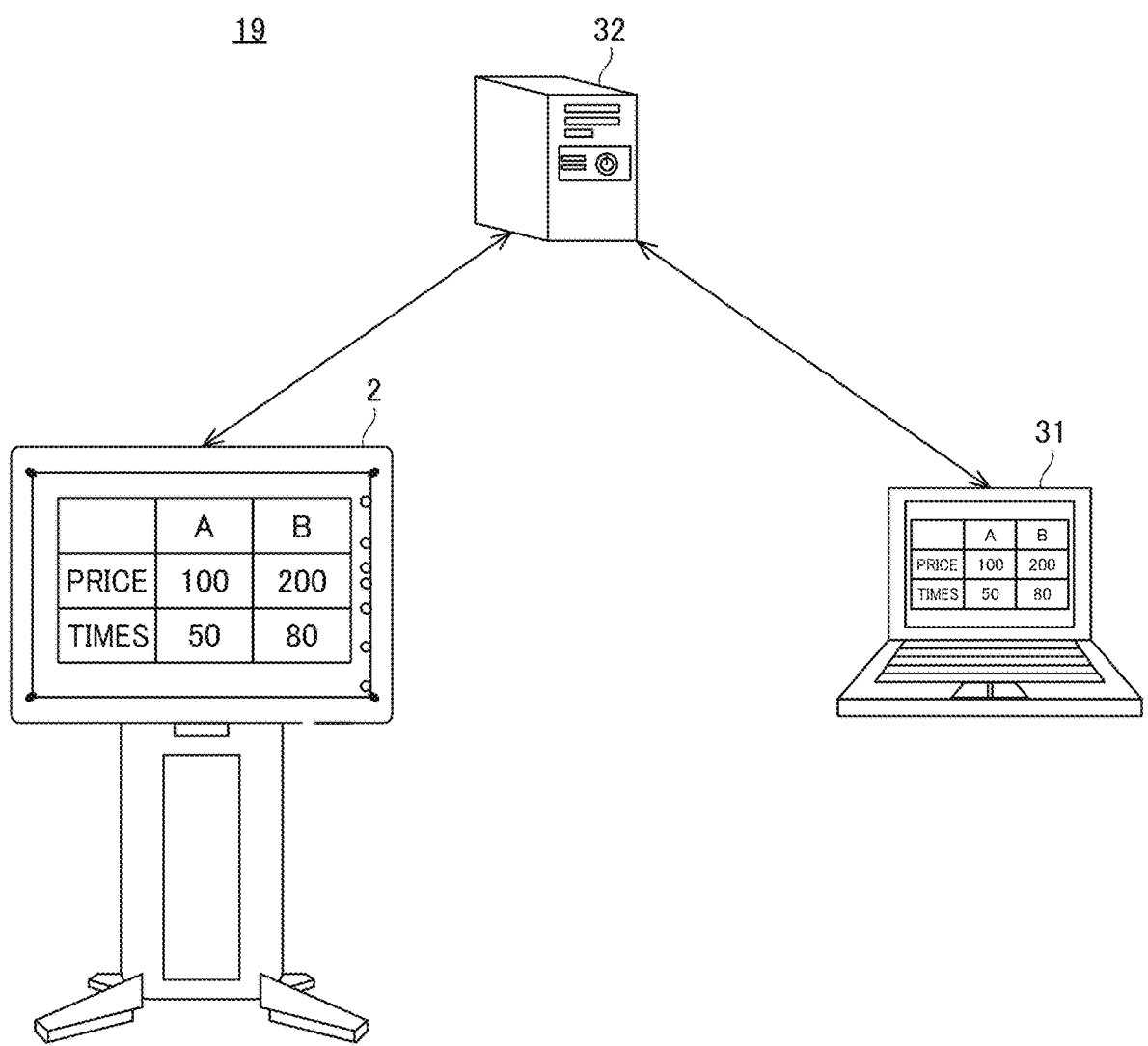
FIG. 21 is a diagram illustrating a configuration of a display system according to a second embodiment of the disclosure.

FIG. 21 is a schematic diagram illustrating an example of a configuration of the display system 19 according to a second embodiment. Each of the display apparatus 2 and the communication terminal 31 is connected to the server 32 via a network such as the Internet. The communication terminal 31 is any terminal, such as a general-purpose information processing terminal, on which a web browser or a dedicated application runs. Examples of the communication terminal 31 include a PC, a smartphone, a tablet terminal, a game console, a personal digital assistant (PDA), a wearable PC, and a car navigation system.

The functions of the display apparatus 2 may be the same as those of the first embodiment except that the display apparatus 2 communicates with the server 32. The display apparatus 2 transmits object data (data indicated in a table) to the server 32. The server 32 transmits a uniform resource locator (URL) for a conference, to be commonly accessed by the display apparatus 2 and the communication terminal 31 to the display apparatus 2. The display apparatus 2 transmits the URL to the communication terminal 31 by e-mail or the like. Thus, the communication terminal 31 communicates with the server 32 and receives the object data transmitted from the display apparatus 2. When the communication terminal 31 displays an object using a web browser, the server 32 generates screen information using hypertext markup language (HTML) or the like. When the communication terminal 31 displays an object using a dedicated application, the server 32 may mainly transmit the object and coordinates thereof to the communication terminal 31 as screen information.

Further, in a case where the communication terminal 31 includes a touch panel, the communication terminal 31 receives input of handwritten data to a table from the user and formats the table in the same manner as the display apparatus 2, for example. The object data after formatting is transmitted to the display apparatus 2 via the server 32 and the network.

As described above, in the display system 19, the display apparatus 2 and the communication terminal 31 interactively process a table. Accordingly, the same object is shared between the display apparatus 2 and the communication terminal 31.

In the configuration illustrated in FIG. 21, alternatively, the server 32 may perform the processing, which is described above, of the display apparatus 2. In this case, the display apparatus 2 (or the communication terminal 31) displays the stroke data and transmits various events to the server 32. The server 32 performs formatting, generates screen information of the display apparatus 2 after the formatting, and transmits the screen information to the display apparatus 2 and the communication terminal 11. In other words, the function units other than the display control unit 23 of the display apparatus 2 described above with reference to FIG. 4 may be implemented by the server 32.

Third Embodiment

A configuration of a display system, which performs one or more of the above-described processes, according to a third embodiment, is described below.

First Example of Configuration of Display System:

Although the display apparatus 2 according to the present embodiment is described as that having a large touch panel, the display apparatus 2 is not limited thereto.

Figure 22:
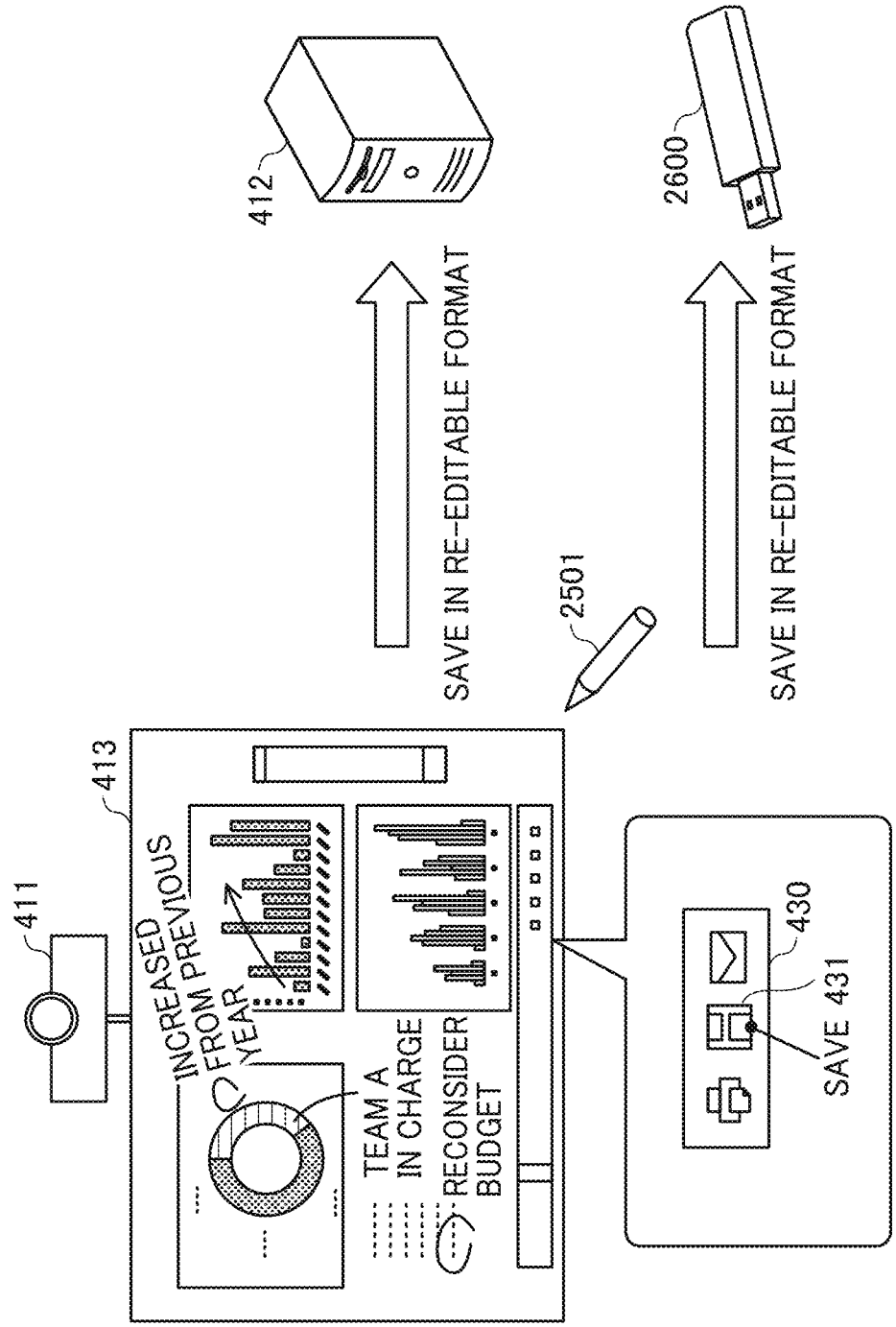
FIG. 22 is a diagram illustrating a configuration of a display system according to a third embodiment of the disclosure.

FIG. 22 is a diagram illustrating an example of the configuration of the display system according to the present embodiment. The display system includes a projector 451, a whiteboard 452, and a server 453, and the projector 451 and the server 453 are communicably connected to each other via a network. In the example of FIG. 22, the projector 411 is installed on the upper face of the whiteboard 413, which is a general whiteboard (standard whiteboard). The projector 411 mainly operates as the display apparatus 2 described above. In other words, the projector 451 is a general-purpose projector, but installed with software that causes the projector 451 to function as the each function of the display apparatus 2 as illustrated in FIG. 5. The server 453 or an external memory, such as a USB memory 2600, may serve as a function corresponding to the storage function of the display apparatus 2. The "standard whiteboard" (the whiteboard 413) is not a flat panel display integral with a touch panel, but is a whiteboard to which a user directly writes or draws with a marker. Note that the whiteboard may be a blackboard, and may be simply a plane having an area large enough to project an image.

The projector 411 employs an ultra short-throw optical system and projects an image (video) with reduced distortion from a distance of about 10 cm to the whiteboard 413. This video may be transmitted from a PC connected wirelessly or by wire, or may be stored in the projector 411.

The user writes or draws on the whiteboard 413 using a dedicated electronic pen 2501. The electronic pen 2501 includes a light-emitting element, for example, at a tip thereof. When a user presses the electronic pen 2501 against the whiteboard 413 for writing or drawing, a switch is turned on, and the light-emitting portion emits light. The wavelength of light of the light-emitting element is near-infrared or infrared that is invisible to a user. The projector 411 includes a camera. The projector 411 captures, with the camera, an image of the light-emitting element, analyzes the image, and determines the direction of the electronic pen 2501. Thus, the receiving unit 21 and the operation receiving unit 26 (illustrated in FIG. 4), implemented by the camera, receives the light as the signal indicating that the electronic pen 2501 is pressed against the whiteboard 452. Further, the electronic pen 2501 emits a sound wave in addition to the light, and the projector 411 calculates a distance based on an arrival time of the sound wave. The projector 411 identifies the position of the electronic pen 2501 based on the direction and the distance. Hand drafted data, which includes handwritten data, is drawn (projected) at the position of the electronic pen 2501.

The projector 411 projects a menu 430. When the user presses a button of the menu 430 with the electronic pen 2501, the projector 411 determines the pressed button based on the position of the electronic pen 2501 and the ON signal of the switch. For example, when a save button 431 is pressed, hand drafted data including handwritten data (coordinate point sequence) input by the user is saved in the projector 411. The projector 411 stores information on a user hand drafted input including a handwriting input in a predetermined server 412, the USB memory 2600, or the like. The information on a user hand drafted input including a handwriting input is stored for each page. Because being stored as coordinates instead of image data, the handwritten information is re-editable according to a user operation. However, in the present embodiment, an operation command can be called by hand drafted input, and the menu 430 does not have to be displayed.

Fourth Embodiment

Figure 23:
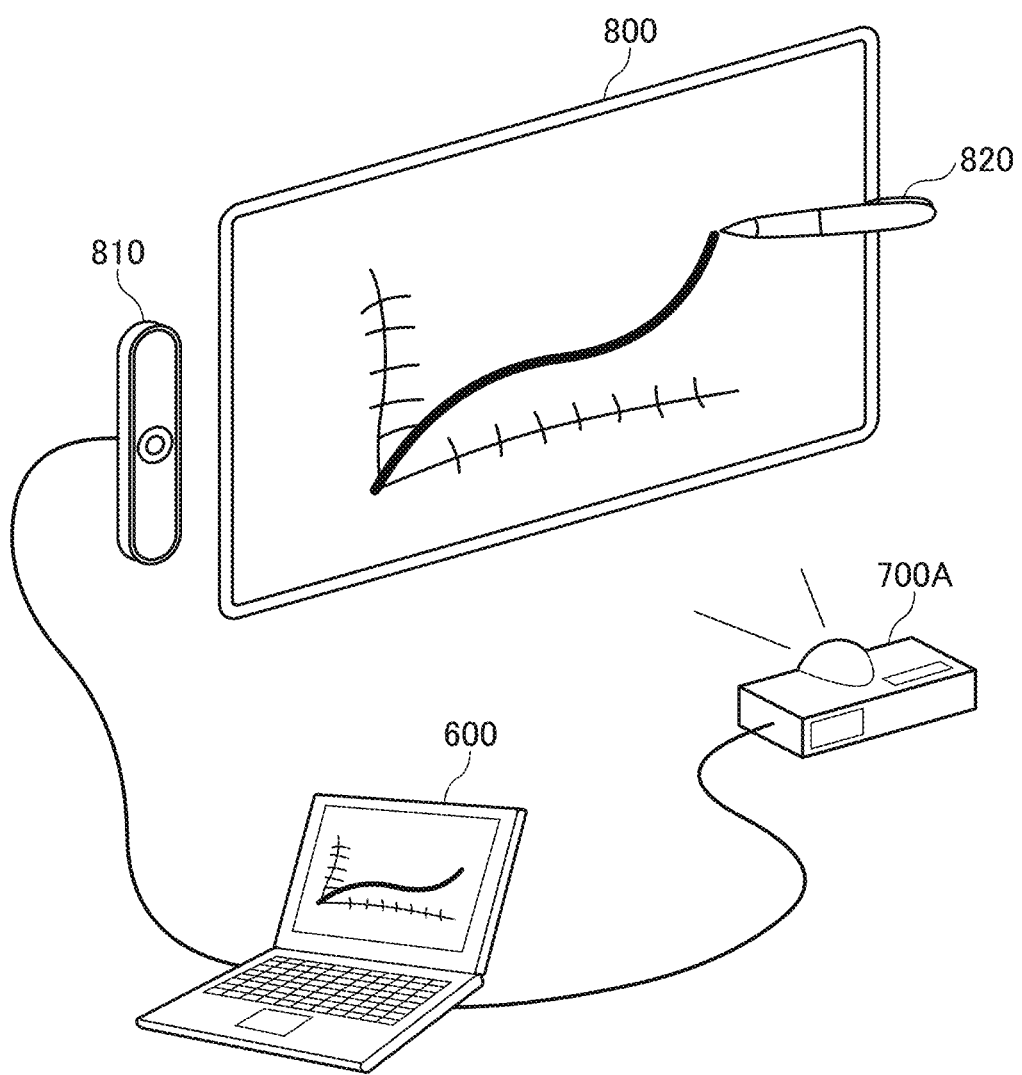
FIG. 23 is a diagram illustrating a configuration of a display system according to a fourth embodiment of the disclosure.

Second Example of Configuration of Display System:

FIG. 23 is a diagram illustrating an example of the configuration of the display system according to a fourth embodiment. In the example illustrated FIG. 23, the display system includes a terminal device 600 (e.g., a PC), an image projection device 700A, and a pen motion detection device 810.

The terminal device 600 is coupled to the image projection device 700A and the pen motion detection device 810 by wire. The image projection device 700A projects image data input from the terminal device 600 onto a screen 800.

The pen motion detection device 810 communicates with an electronic pen 820 to detect a motion of the electronic pen 820 in the vicinity of the screen 800. More specifically, the pen motion detection device 810 detects coordinate information indicating a position pointed by the electronic pen 820 on the screen 800 and transmits the coordinate information to the device apparatus 600. The method of detecting is substantially the same as one described with reference to FIG. 22. A function corresponding to the receiving unit 21 and the operation receiving unit 26 (illustrated in FIG. 4) of the display apparatus 2, is implemented by the electronic pen 820 and the pen motion detection device 810. Other functions corresponding to the functional units other than the contact detection unit 21 of the display apparatus 2 are implemented by the terminal device 600. In other words, the terminal device 600 is a general-purpose computer, and installed with software that causes the terminal device 600 to function as the function units, except for the receiving unit 21 and the operation receiving unit 26 of the display apparatus 2 as illustrated in FIG. 4. In addition, a function corresponding to the display control unit 23 is implemented by the terminal device 600 and the image projection device 700A.

Based on the coordinate information received from the pen motion detection device 810, the terminal device 600 generates image data (hand drafted data) of user hand drafted input by using the electronic pen 820 and causes the image projection device 700A to project the hand drafted data on the screen 800.

The terminal device 600 generates data of a superimposed image in which an image based on the handwritten data input by the electronic pen 820 is superimposed on the background image projected by the image projection device 700A.

Fifth Embodiment

Figure 24:
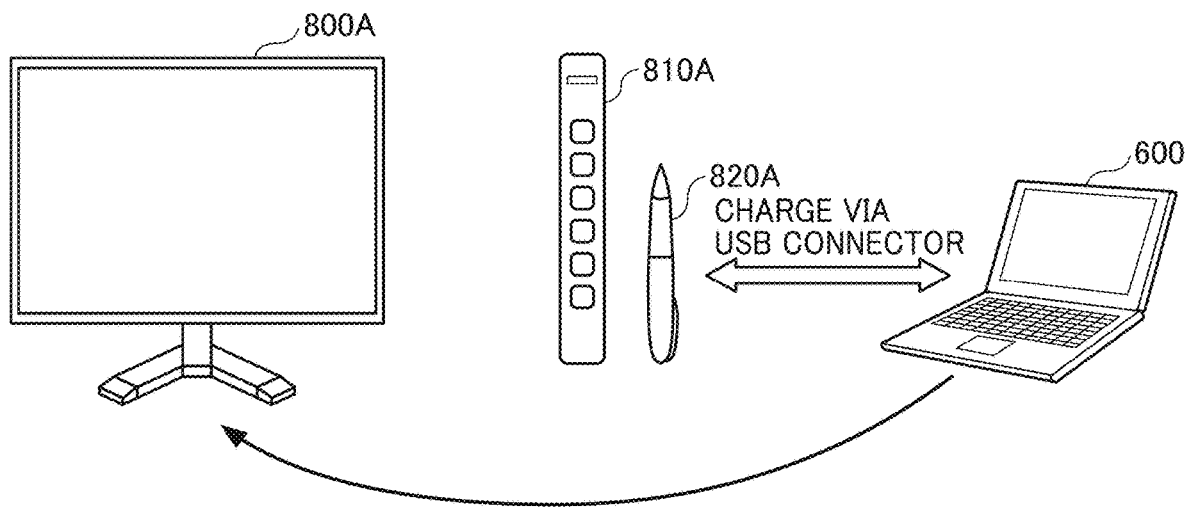
FIG. 24 is a diagram illustrating a configuration of a display system according to a fifth embodiment of the disclosure.

Third Example of Configuration of Display System:

FIG. 24 is a diagram illustrating a configuration of a display system according to a fifth embodiment. In the example of FIG. 24, the display system includes a terminal device 600, a display 800A, and a pen motion detection device 810A.

The pen motion detection device 810A, which is disposed in the vicinity of the display 800A, detects coordinate information indicating a position pointed by an electronic pen 820A on the display 800A and transmits the coordinate information to the terminal device 600. The method of detecting is substantially the same as one described with reference to FIG. 22. In the example of FIG. 24, the electronic pen 820A can be charged from the terminal device 600 via a USB connector. A function corresponding to the receiving unit 21 and the operation receiving unit 26 (illustrated in FIG. 4) of the display apparatus 2, is implemented by the electronic pen 820A and the pen motion detection device 810A. Other functions corresponding to the functional units other than the receiving unit 21 and the operation receiving unit 26 (illustrated in FIG. 4) of the display apparatus 2 are implemented by the terminal device 600. In other words, the terminal device 600 is a general-purpose computer, and installed with software that causes the terminal device 600 to function as the function units, except for the receiving unit 21 and the operation receiving unit 26, of the display apparatus 2 as illustrated in FIG. 4. In addition, a function corresponding to the display control unit 23 is implemented by the terminal device 600 and the display 800A.

Based on the coordinate information received from the pen motion detection device 810, the terminal device 600 generates image data of handwritten data input by the electronic pen 820A and displays an image based on the handwritten data on the display 800A.

Sixth Embodiment

Figure 25:
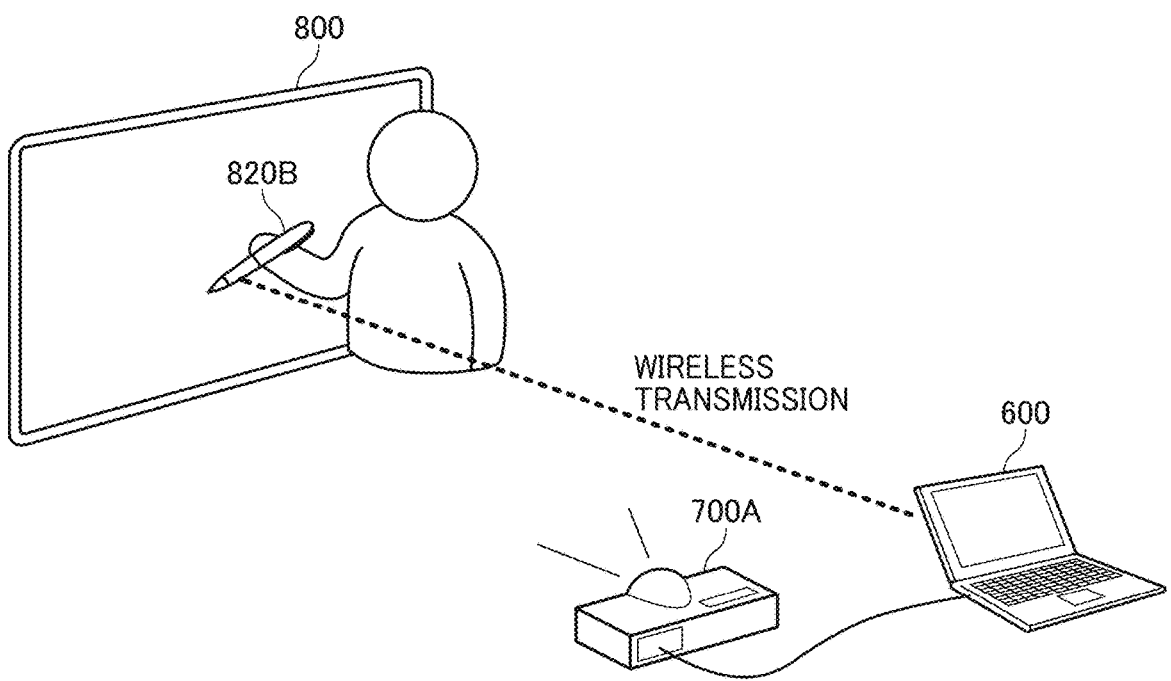
FIG. 25 is a diagram illustrating a configuration of a display system according to a sixth embodiment of the disclosure.

Fourth Example of Configuration of Display System:

FIG. 25 is a diagram illustrating a configuration of a display system according to a sixth embodiment. In the example illustrated FIG. 25, the display system includes a terminal device 600 and an image projection device 700A.

The terminal device 600 communicates with an electronic pen 820B through by wireless communication such as BLUETOOTH, to receive coordinate information indicating a position pointed by the electronic pen 820B on a screen 800. The electronic pen 820B may read minute position information on the screen 800, or receive the coordinate information from the screen 800.

Based on the received coordinate information, the terminal device 600 generates image data (handwritten data) of handwriting input by the electronic pen 820B, and causes the image projection device 700A to project an image based on the handwritten data.

The terminal device 600 generates data of a superimposed image in which an image based on the handwritten data input by the electronic pen 820B is superimposed on the background image projected by the image projection device 700A. A function corresponding to the receiving unit 21 and the operation receiving unit 26 (illustrated in FIG. 4) of the display apparatus 2, is implemented by the electronic pen 820B and the terminal device 600. Other functions corresponding to the functional units other than the receiving unit 21 and the operation receiving unit 26 (illustrated in FIG. 4) of the display apparatus 2 are implemented by the terminal device 600. In other words, the terminal device 600 is a general-purpose computer, and installed with software that causes the terminal device 600 to function as the function units of the display apparatus 2 as illustrated in FIG. 5. In addition, a function corresponding to the display control unit 23 is implemented by the terminal device 600 and the image projection device 700A.

The embodiments described above are applied to various system configurations.

Variation:

The above-described embodiment is illustrative and does not limit the present disclosure. Thus, numerous additional modifications and variations are possible in light of the above teachings within the scope of the present disclosure. Any one of the above-described operations may be performed in various other ways, for example, in an order different from the one described above.

For example, although the display apparatus 2 that is placed in substantially perpendicular to the floor has been described in the above-described embodiments, the above-described embodiments may be similarly applied to the display apparatus 2 that is placed in substantially horizontal to the floor. On the display apparatus 2 that is placed in substantially horizontal to the floor, the comment section 11 may be displayed not only on the left and right of the display but also on any one of the four sides.

Further, in the description of some of the embodiments given above, an electronic whiteboard is used as an example of the display apparatus 2, but this is not limiting. A device having a substantially the same functions as the electronic whiteboard may be referred to as an electronic information board, an interactive board, or the like. The present disclosure is applicable to any information processing apparatus with a touch panel. Examples of the information processing apparatus with a touch panel include, but not limited to, a projector (PJ), a data output device such as a digital signage, a head up display (HUD), an industrial machine, an imaging device such as a digital camera, a sound collecting device, a medical device, a network home appliance, a notebook PC, a mobile phone, a smartphone, a tablet terminal, a game machine, a personal digital assistant (PDA), a wearable PC, and a desktop PC.

Further, in the embodiments described above, the display apparatus 2 detects the coordinates of the pen tip of the pen with the touch panel. However, the display apparatus 2 may detect the coordinates of the pen tip using ultrasonic waves. Further, the pen transmits ultrasonic waves together with light emission, and the display apparatus 2 calculates a distance based on an arrival time of the ultrasonic waves. The display apparatus 2 determines the position of the pen based on the direction and the distance. The projector draws (projects) the trajectory of the pen as stroke data.

In the block diagram such as FIG. 4, functional units are divided into blocks in accordance with main functions of the display apparatus 2, in order to facilitate understanding the operation by the display apparatus 2. Each processing unit or each specific name of the processing unit is not to limit a scope of the present disclosure. A process implemented by the display apparatus 2 may be divided into a larger number of processes depending on the content of process. Also, one processing unit may be divided so as to include more processes.

A part of the processing performed by the display apparatus 2 may be performed by a server connected to the display apparatus 2 via a network.

Each of the functions of the described embodiments may be implemented by one or more processing circuits. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The receiving unit 21 is an example of a receiving unit. The comment control unit 24 is an example of information display control unit. The display control unit 23 is an example of a display control unit.

In a related known technique, an object represented by such as handwritten data is hidden by information when the display apparatus displays the information. Such a case may cause a situation in which a user has difficulty to remember content of the object, which is represented by such as the handwritten data, when the object is hidden, by, for example a comment displayed. In addition, such a case may cause a situation in which a plurality of users has difficulty to share the handwritten data that is hidden, in case that the plurality of users attends in a conference from a plurality of different sites.

According to one or more embodiments of the disclosure, a display apparatus that allows the user to recognize an object when the display apparatus displays additional information.

The invention claimed is:

1. A display apparatus, comprising:
circuitry configured to:
display, on a display, a display component along with an object, a presence of the display component indicating a presence of additional information; and
display, in response to receiving a selection of the display component, an information display section that includes the additional information, along with the display component and the object at a same time,
wherein:
in case that the display component with which the selection has been received is on left of the display with respect to a middle of the display, the circuitry displays the information display section on a left end of the display, and
in case that the display component with which the selection has been received is on right of the display with respect to the middle of the display, the circuitry displays the information display section on a right end of the display.

2. The display apparatus of claim 1, wherein,
in response to receiving the selection of the display component, the circuitry generates the information display section including the additional information corresponding to the display component.

3. The display apparatus of claim 2, wherein,
in a case that the information display section is displayed, and that the selection of the display component is received in a display range including the object, the circuitry determines whether the display range has a space for displaying the additional information corresponding to the display component, and
based on a determination indicating that the display range has the space, the circuitry displays the additional information in the space.

4. The display apparatus of claim 3, wherein,
in case of an absence of the space, the circuitry displays the additional information in a semi-transparent manner in proximity to the display component with which the selection has been received.

5. The display apparatus of claim 1, wherein,
the circuitry displays the information display section in an area in proximity to the display component with which the selection has been received.

6. The display apparatus of claim 1, wherein,
the circuitry displays a display range including the object opposite to the information display section with respect to the middle of the display.

7. The display apparatus of claim 6, wherein,
the additional information corresponding to the display component is input according to a user operation of user hand drafted input.

8. The display apparatus of claim 6, further comprising:
the display range includes a plurality of display components, the plurality of display components including the display component,
wherein the circuitry is further configured to:
display, in the information display section, identification information associated with each of the plurality of display components in a selectable manner, the identification information identifying information corresponding to each of the plurality of display components,
display, in the display range, the identification information along with each of the plurality of display components, and
in response to receiving, in the information display section, a selection of the identification information associated with one of the plurality of display components, display, in the information display section, information corresponding to the one of the plurality of display components.

9. The display apparatus of claim 1, wherein,
the circuitry displays the information display section having a width determined according to a width of data represented by the additional information.

10. A display method, comprising:
displaying, on a display, a display component along with an object, a presence of the display component indicating a presence of additional information that corresponds to the display component and related to the object; and
displaying, in response to receiving a selection of the display component, an information display section that includes the additional information, along with the display component and the object at a same time,
wherein,
in case that the display component with which the selection has been received is on left of the display with respect to a middle of the display, the method displays the information display section on a left end of the display, and
in case that the display component with which the selection has been received is on right of the display with respect to the middle of the display, the method displays the information display section on a right end of the display.

11. The method according to claim 10, further comprising:
generating the information display section to include the additional information corresponding to the display component, in response to receiving the selection of the display component.

12. The method of claim 10, wherein, the displaying of the information display section that includes the additional information, along with the display component and the object includes displaying the information display section in an area in proximity to the display component with which the selection has been received.

13. The method of claim 10, wherein,
the method displays a display range including the object opposite to the information display section with respect to the middle of the display.

14. The method of claim 13, further comprising:
inputting, according to a user operation of user hand drafted input, the additional information corresponding to the display component.

15. The method according to claim 13, further comprising:
displaying at least one additional display components so that there are a plurality of display components, the plurality of display components being displayed in the display range;
displaying, in the information display section, identification information associated with each of the plurality of display components in a selectable manner, the identification information identifying information corresponding to each of the plurality of display components;
displaying, in the display range, the identification information along with each of the plurality of display components; and
in response to receiving, in the information display section, a selection of the identification information associated with one of the plurality of display components, displaying, in the information display section, information corresponding to the one of the plurality of display components.

16. The method according to claim 10, wherein,
the method displays the information display section having a width determined according to a width of data represented by the additional information.

17. A display apparatus, comprising:
circuitry configured to:
display, on a display, a display component along with an object, a presence of the display component indicating a presence of additional information; and
display, in response to receiving a selection of the display component, an information display section that includes the additional information, along with the display component and the object at a same time,
wherein:
in response to receiving the selection of the display component, the circuitry generates the information display section including the additional information corresponding to the display component., in a case that the information display section is displayed, and that the selection of the display component is received in a display range including the object, the circuitry determines whether the display range has a space for displaying the additional information corresponding to the display component, and based on a determination indicating that the display range has the space, the circuitry displays the additional information in the space, and in case of an absence of the space, the circuitry displays the additional information in a semi-transparent manner in proximity to the display component with which the selection has been received.

\* \* \* \* \*